(12) United States Patent
Momoi et al.

(10) Patent No.: US 7,714,957 B2
(45) Date of Patent: May 11, 2010

(54) LIQUID CRYSTAL DISPLAY DEVICE AND METHOD OF CONTROLLING VIEWING ANGLE THEREOF

(75) Inventors: Yuichi Momoi, Yokohama (JP); Kazuyoshi Nagayama, Yokohama (JP); Hidefumi Yoshida, Yokohama (JP)

(73) Assignee: LG Display Co., Ltd., Seoul (KR)

( * ) Notice: Subject to any disclaimer, the term of this patent is extended or adjusted under 35 U.S.C. 154(b) by 273 days.

(21) Appl. No.: 11/642,953

(22) Filed: Dec. 21, 2006

(65) Prior Publication Data

US 2007/0146610 A1    Jun. 28, 2007

(30) Foreign Application Priority Data

Dec. 28, 2005    (JP)    ............................ 2005-380295

(51) Int. Cl.
*G02F 1/1335* (2006.01)
*G02F 1/1343* (2006.01)

(52) U.S. Cl. ...................................... 349/106; 349/144

(58) Field of Classification Search ......... 349/104–111, 349/143, 144
See application file for complete search history.

(56) References Cited

U.S. PATENT DOCUMENTS 7,057,698 B2 *    6/2006    Chung et al. ................ 349/141
2004/0227980 A1    11/2004    Chueh et al.

FOREIGN PATENT DOCUMENTS

| JP | 9-19740 | 1/1997 |
| JP | 2001-166309 | 6/2001 |
| JP | 2004-325563 | 11/2004 |

* cited by examiner

*Primary Examiner*—Kevin S Wood
(74) *Attorney, Agent, or Firm*—McKenna Long & Aldridge

(57) ABSTRACT

A liquid crystal display device, in which a viewing angle is controlled, and a viewing angle controlling method are provided. A liquid crystal display device includes at least one pixel including at least one color sub-pixel and at least one white sub-pixel, wherein liquid crystal molecules in the white sub-pixel are aligned to be driven in a different direction than liquid crystal molecules in the color sub-pixel.

32 Claims, 19 Drawing Sheets

Angle between LC molecule and polarizing axis in W pixel

LIQUID CRYSTAL DISPLAY DEVICE AND METHOD OF CONTROLLING VIEWING ANGLE THEREOF

This application claims the benefit of Japanese Patent Application No. JP2005-380295, filed on Dec. 28, 2005, which is hereby incorporated by reference for all purposes as if fully set forth herein.

BACKGROUND OF THE INVENTION

1. Field of the Invention

The present invention relates to a liquid crystal display (LCD) device in which a viewing angle is controlled and a method of controlling the viewing angle thereof.

2. Discussion of the Related Art

LCD devices may be driven by a low voltage and may be used in a display of a word processor, a personal computer, or other display applications.

The LCD device has a substrate surface treated to provide a uniform alignment of the liquid crystal and uniformly displays an image.

Due to these, a displayed image on the LCD device varies according to a viewing direction. In other words, the LCD has a viewing angle dependence.

For example, TN and STN LCD devices have a narrow viewing angle, because of light transmission and interruption by a liquid crystal shutter is carried out by controlling a polarization of light using an alignment direction of a rod-shaped liquid crystal molecule.

A viewing angle controlling technique is proposed to improve the viewing angle characteristics of the LCD device. As an example, Japanese Unexamined Patent Application Publication No. Hei 9-19740 discloses a LCD device having two LCDs attached to each other, and a viewing angle controlling structure that collimates light.

A process of controlling the viewing angle of an LCD disclosed in the related art will be described.

FIGS. 1B and 1D are sectional views schematically illustrating a LCD device in which two LCDs are attached to each other and collimated light enters.

First, the collimated light enters a first LCD panel 1. The first LCD panel 1 is identical to a LCD panel of the related art and displays an image.

The light emitted from the first LCD panel 1 enters a second LCD panel 2, and the transmission and scattering of the light is controlled by the second LCD panel 2. The image is displayed at a narrow viewing angle in the transmission mode and at a wide viewing angle in the scattering mode.

In this example, a TN LCD panel is used as the first LCD panel 1 and a polymer dispersed LCD panel is used as the second LCD panel 2.

Meanwhile, when employing the polymer dispersed LCD panel as the second LCD panel 2, as illustrated in FIG. 1D, and because liquid crystal molecules in a liquid crystal droplet that are dispersed within a polymer have a random direction when a voltage is not applied thereto, the incident light is scattered to wide angles (6b,6c) with a brightness similar to that found directly in front of the display 6a.

A relationship between the brightness and the viewing angle may be represented by a graph as illustrated in FIG. 1C.

Meanwhile, as illustrated in FIG. 1B, because the liquid crystal molecules of the liquid crystal droplet within the polymer are aligned along an electric field when the voltage is applied thereto, the light exits the first LCD panel 1, and the second LCD panel 2 becomes transparent.

Because the collimated light is essentially perpendicular to the LCD panels, a relationship between brightness and a viewing angle when a voltage is applied to the second LCD panel 2. In this mode, the image is represented by a graph as illustrated in FIG. 1A displayed has a narrow viewing angle. As such, in the related art, the control of the viewing angle is carried out by controlling the brightness with respect to a viewing angle by applying a voltage to the second LCD panel 2.

In the related art, because a component to collimate a light from a fluorescent lamp is required and it is necessary to combine polymer dispersed LCD panels to each other, manufacturing costs are high.

Next, other related art is disclosed in Japanese Unexamined Patent Application Publication No. 2004-325563 and will be described.

According to this related art, in a VA mode, the viewing angle is controlled by changing an electrode structure. Electrodes are divided, a gap of an opening between electrodes is slanted, and the shape of electric field is changed to control brightness so as to change the viewing angle.

According to the related art, because the shape of the electrode is determined when manufacturing the electrode and is not changed after manufacturing the LCD panel, a pixel is formed by combining several electrodes' shapes, and a pixel having an optimal viewing angle characteristic is selected and others are not displayed. Thus, optical efficiency is deteriorated.

Moreover, the effect of the viewing angle control, as disclosed in the above patent publication, exhibits maximal brightness in a specific direction, but the effect is not exhibited in other directions.

SUMMARY OF THE INVENTION

Accordingly, the present invention is directed to a liquid crystal display device and a method of controlling viewing angle thereof that substantially obviate one or more problems due to limitations and disadvantages of the related art.

An advantage of the present invention is to provide a LCD device in which an image can be normally displayed with a wide viewing angle as in the related art, and if necessary, the viewing angle may be changed so that contrast is reduced and the viewing angle can be reduced, and a method of controlling a viewing angle thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes: at least one pixel including at least one color sub-pixel and at least one white sub-pixel, wherein liquid crystal molecules in the white sub-pixel are aligned to be driven in a different direction than liquid crystal molecules in the color sub-pixel.

In another aspect of the present invention, a liquid crystal display device includes: at least one pixel including at lease one color sub-pixel and at least one white sub-pixel; and a liquid crystal molecule alignment controller to adjust a contrast ratio of the liquid crystal display, wherein the liquid crystal molecules are aligned at an angle of on of about 3 degrees to about 0 (zero) degrees and about 6 degrees to about 0 (zero) degrees with respect to an absorbing axis of at least one polarizing plate in one of the color sub-pixel and the white sub-pixel by the liquid crystal molecule alignment controller.

In another aspect of the present invention, aligning liquid crystal molecules in one color sub-pixel and at least one white sub-pixel in one pixel, wherein the liquid crystal molecules in the white sub-pixel are aligned differently from the liquid crystal molecules in the color sub-pixel; and controlling a viewing angle by applying an electric field to the sub-pixel and the white sub-pixel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to an embodiment of the present invention, examples of which is illustrated in the accompanying drawings.

In general, a VA and a TN mode in which a liquid crystal molecule is twisted between upper and lower substrates by 90 degrees may be used to provide a wide viewing angle display.

In the VA mode, the liquid crystal molecule is vertically aligned when power is off and is horizontally aligned when power is on so that the viewing angle is improved.

In the TN mode, the liquid crystal molecule is horizontally aligned for a normally white display when power is off and rises along the electric field when power is on.

Figure 1A:
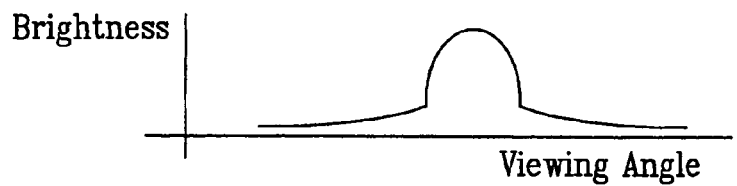
FIGS. 1A to 1D illustrate brightness versus viewing angle in a polymer dispersed LCD panel of the related art.
Figure 1B:
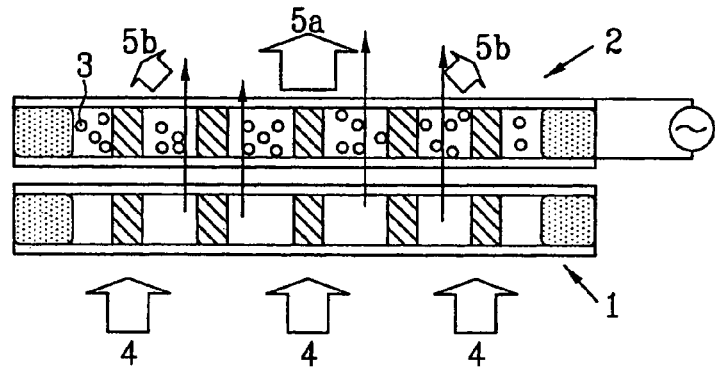
Figure 1C:
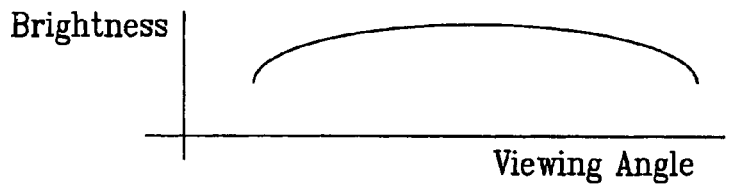
Figure 1D:
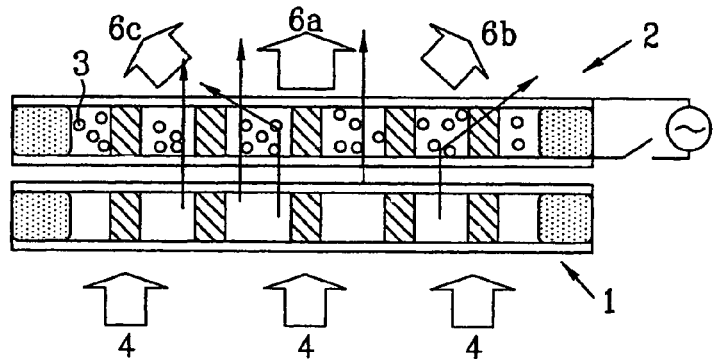
Figure 2A:
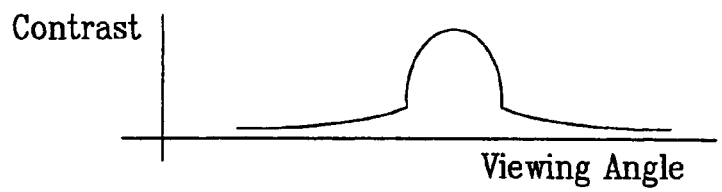
FIGS. 2A to 2D illustrate brightness versus viewing angle in a LCD device according to the present invention.
Figure 2B:
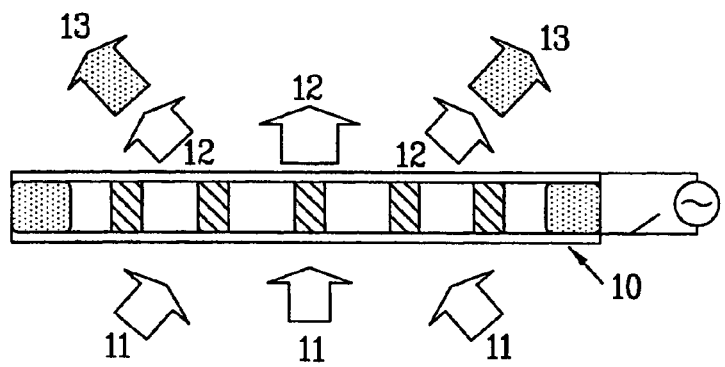
Figure 2C:
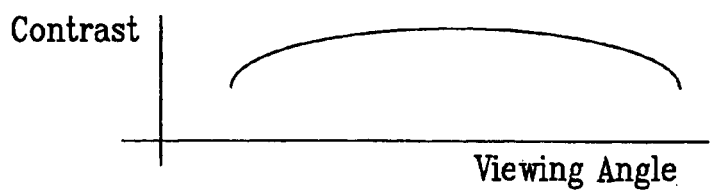
Figure 2D:
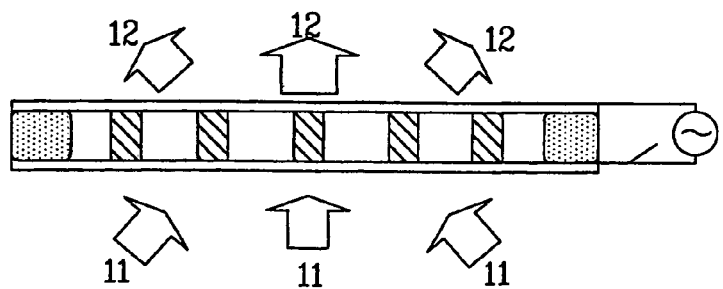

The VA mode and the TN mode displays may display an image visible at a wide viewing angle (See FIG. 2D).

But, if a narrow viewing angle is desired, the image is hardly visible because the contrast deteriorates for wide viewing angles. However, even when the display is in a narrow viewing angle mode, the contrast of the image should not deteriorate (See FIG. 2B).

Thus, in the VA LCD and the TN LCD according to embodiments of the present invention, a sub-pixel (hereinafter, referred to as 'RGB pixels') in which RGB regions are formed in a single pixel. Moreover, four color pixels including a W pixel with a viewing angle characteristic different from the RGB pixels form a single unit.

In the VA mode, when a wide viewing angle mode is displayed, the image is displayed by turning the RGB pixels on and the W pixel is turned off. Then, the same viewing angle characteristic as that of the VA LCD panel of the relate art may be obtained.

Next, when the narrow viewing angle mode is displayed, the image is displayed by turning the RGB pixels on and the W pixel is turned on. The W pixel has a viewing angle characteristic different from those of the RGB pixels, and the viewing angle control is enabled therein.

In the TN mode, when a wide viewing angle mode is displayed, the image is displayed by the RGB pixels and the W pixel is turned off. Then, the related art viewing angle can be obtained.

Next, when the narrow viewing angle mode is displayed, the image is displayed by turning the three RGB pixels on and the fourth W pixel is switched from the off state to the on state. The W pixel has a viewing angle characteristic different from those of the RGB pixels, and the viewing angle control is enabled therein.

Accordingly, when a direction where the liquid crystal molecule in the W pixel is slanted by the electric field is a direction (parallel to an absorbing axis of the polarizing plate)

different from a direction (45 degrees with respect to the absorbing axis of the polarizing plate) where the liquid crystal molecules in other RGB pixels are slanted by the electric field, an optical characteristic different from those of the RGB pixels can be obtained.

According to the alignment of the liquid crystal molecules in the W pixel different from the alignment of the liquid crystal molecules in the RGB pixels due to the electric field, the W pixel has an optical characteristic different from those of the RGB pixels and the contrast is controlled to control the viewing angle.

However, when a sub-pixel of the RGB pixels has a region, used to display an image, where the liquid crystal molecules are slanted at 45 degrees with respect to the absorbing axis of the polarizing plate, and a region, used to control the viewing angle, where the liquid crystal molecules are parallel to the absorbing axis of the polarizing plate and the same viewing angle controlling function as that of the W pixel, in addition to a usual displaying function of the sub-pixel in the RGB pixels, the W pixel can be eliminated.

In the present invention, the sub-pixel other than the at least one LCD device or the part other than the LCD device in the sub-pixel as a display device is a homogeneous alignment sub-pixel or a VA sub-pixel for the VA LCD device and a homogeneous alignment sub-pixel or a VA sub-pixel for the TN LCD device.

FIG. 2A is a graph illustrating a relationship between the contrast and the viewing angle in the narrow viewing angle mode. FIG. 2B illustrates the narrow viewing angle mode where the viewing angle becomes narrow due to light emitted from the W pixel of the LCD panel 10.

FIG. 2A corresponds with FIG. 2B, and a portion in FIG. 2A corresponding to the light (arrows indicated by a reference numeral 12) emitted from the RGB pixels in the central region of the LCD panel in FIG. 2B forms a peak of the contrast graph.

Arrows 11 indicate incident light and arrows 13 indicate emitted light passing through the W pixel. A reference numeral 10 is assigned to the LCD panel.

As such, on the both lateral sides of the LCD panel at wide viewing angles, the contrast of the emitted light is more deteriorated than that of the RGB pixels due to the emitted light indicated by the arrows 13.

In the present invention, the viewing angle is controlled by controlling the contrast with respect to the viewing angle.

FIG. 2C is a graph illustrating the contrast and the viewing angle in a usual wide viewing angle mode.

FIG. 2D illustrates the state of incident light entering the LCD panel 10 and light emitted therefrom.

FIG. 2C corresponds to FIG. 2D and illustrates the wide viewing angle obtained without the peak of the contrast as illustrated in FIG. 2A that is formed by the light 12 emitted from the RGB pixels in the central region of the LCD panel in FIG. 2D.

Reference will now be made in detail to the preferred embodiments of the present invention, examples of which are illustrated in the accompanying drawings. It is apparent to those skilled in the art that the present invention is not limited by the following embodiments of the present invention and various modifications and variations thereof can be made without departing from the spirit or scope of the inventions.

In the present invention, in at least one pixel, at least four sub-pixels including RGB pixels formed with three color filters and a W pixel without a filter form a unit pixel.

Figure 3:
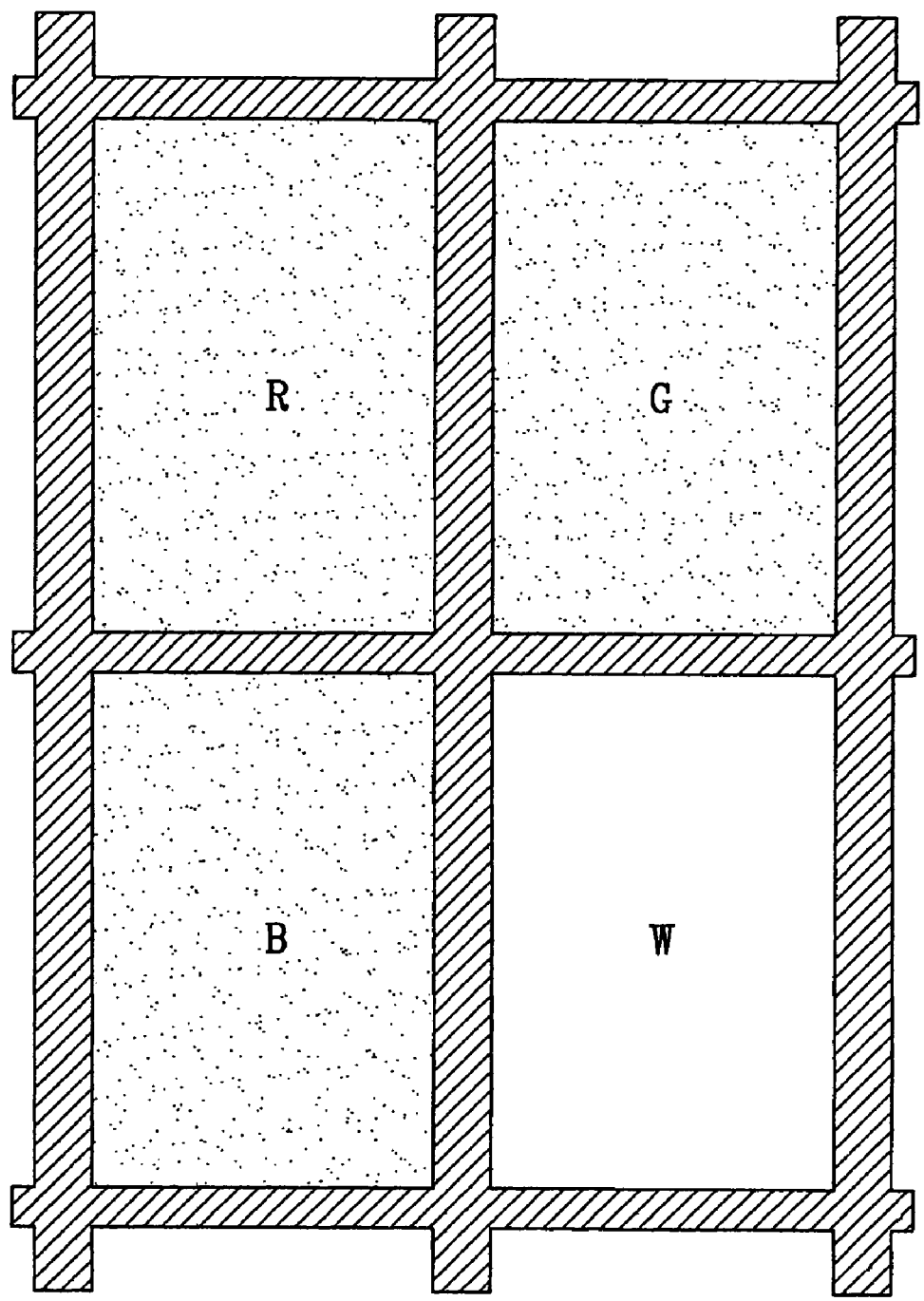
FIG. 3 is a schematic view illustrating an arrangement of RGB pixels and a W pixel.

For example, as illustrated in FIG. 3, the unit pixel is effectively constructed by arranging each RGB pixel and the W pixel in the form of 2×2 matrix. However, this is an example of the unit pixel, and the unit pixel is not limited to this example.

Embodiment 1

Figure 4:
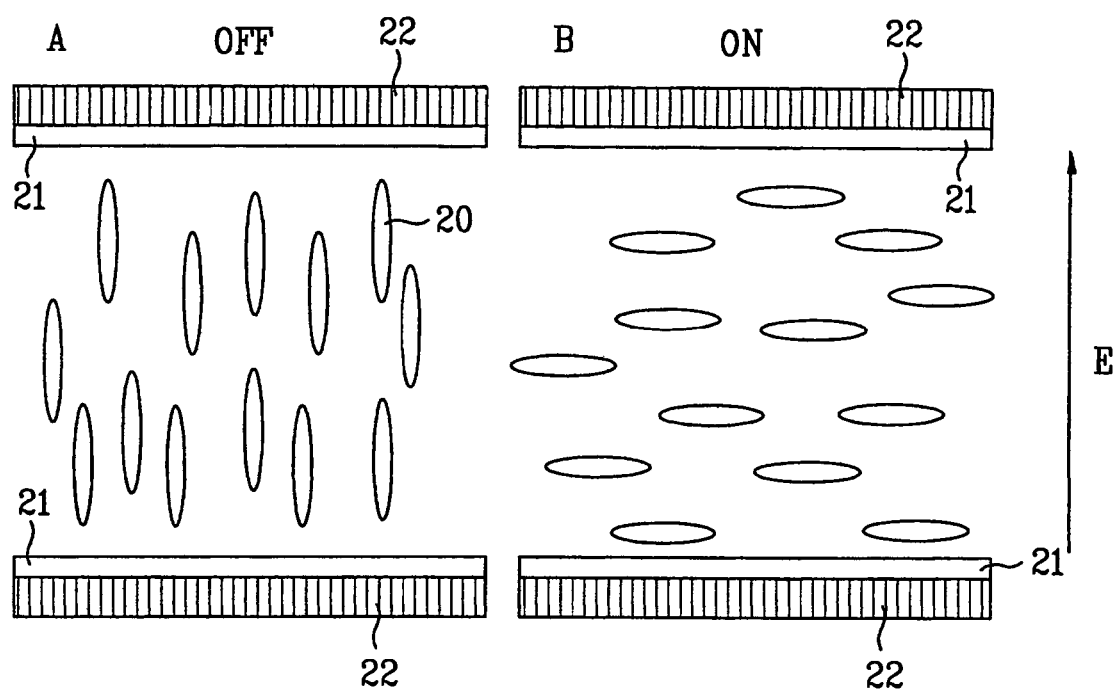
FIG. 4 is a sectional view illustrating operation of a liquid crystal molecule in a VA LCD device.

FIGS. 4A and 4B are sectional views illustrating operation of a liquid crystal molecule of a VA LCD device.

In this embodiment, the LCD device employs the VA mode, as illustrated in FIG. 4A, and because there is no electric field when electric power is off, the liquid crystal molecules 20 are vertically aligned with respect to a substrate 21.

Because polarizing plates 22 are attached to a liquid crystal module, a polarized incident light passes the polarizing plates 22 without retardation and becomes black. When power is applied to apply an electric field E to LCD, because the liquid crystal molecule has a negative dielectric anisotropy and intends to be perpendicular to the electric flux, the liquid crystal molecule, as illustrated in FIG. 4B, is aligned to be parallel to the substrate.

Moreover, in the present invention, because the-alignment directions of the liquid crystal molecules of the RGB pixels and the liquid crystal molecule of the W pixel are different from each other when the power is applied, this will be described hereinafter.

FIGS. 5A to 5D are schematic top views illustrating the aligned direction of the liquid crystal molecules in a single pixel when the power is supplied to the RGB pixels and the W pixel or not.

Figure 5:
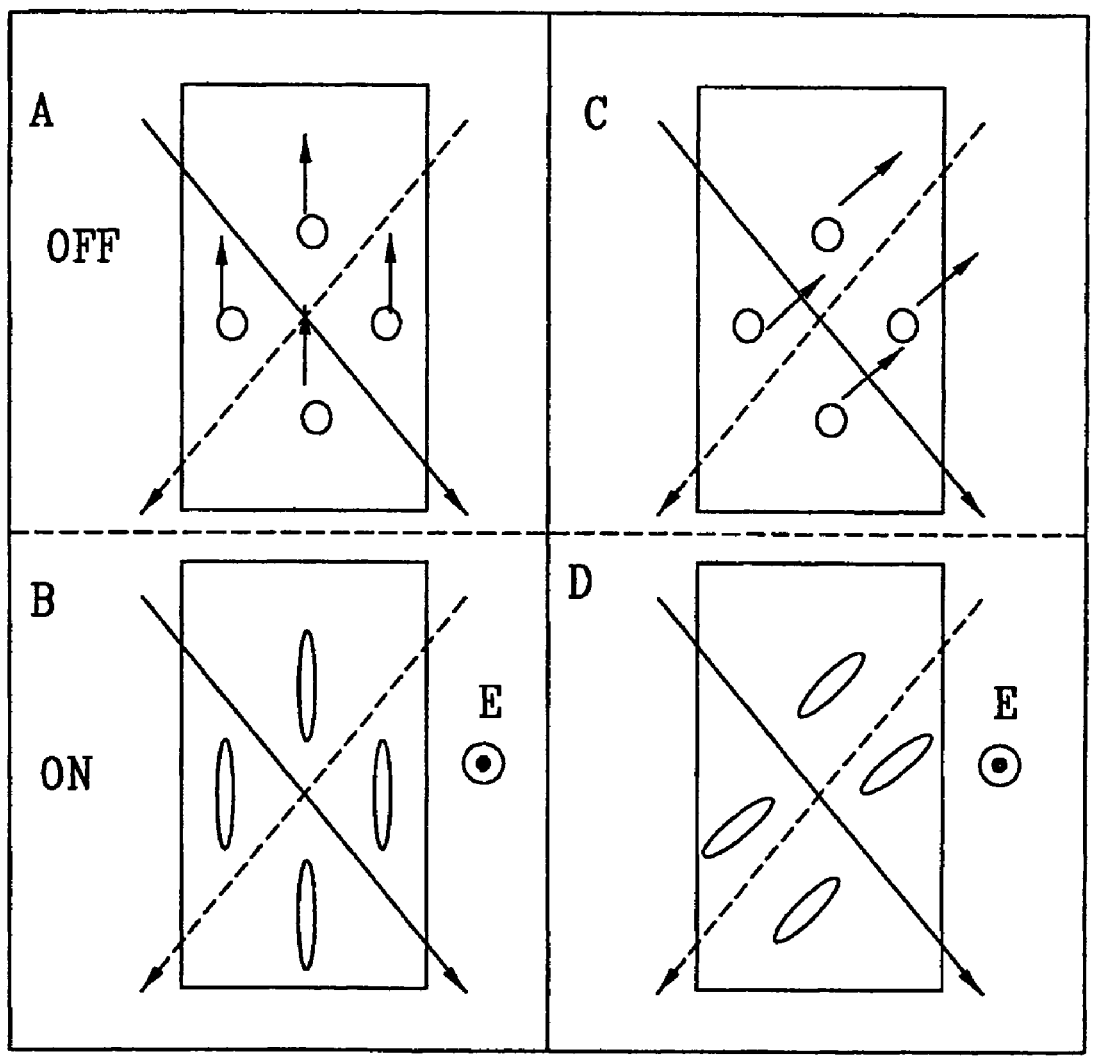
FIG. 5 is a schematic top view illustrating different operating directions of the RGB pixels and the W pixel in the VA LCD device.

FIGS. 5A and 5B, on the left side in the drawing, illustrate the operating direction of the liquid crystal molecules in the RGB pixels and FIGS. 5C and 5D, on the right side in the drawing, illustrate the operating direction of the liquid crystal molecules in the W pixel when the electric field E is applied thereto or not. Here, a solid arrow and dotted arrow indicate absorbing axes of the polarizing plates.

The RGB pixels will be described with reference to FIGS. 5A and 5B. Because the liquid crystal molecules are vertically aligned when power is not supplied (FIG. 5A), the liquid crystal molecules look like ○ (a circle). However, when the power is supplied (FIG. 5B), the liquid crystal molecules are aligned to being 45 degrees with respect to the polarizing axis of the polarizing plate by forming a structure or a slit in the LCD panel.

The liquid crystal molecules are aligned at an angle with respect to the absorbing axis of the polarizing plate so that the incident polarized light can have a retardation, and light is emitted from the opposite polarizing plate to display an image at a wide viewing angle.

The W pixel will be described with reference to FIGS. 5C and 5D. Because the liquid crystal molecules in the W pixel are vertically aligned when the power is not applied (FIG. 5C), the liquid crystal molecules look like ○ (a circle). However, when the power is applied (FIG. 5D), the liquid crystal molecules are aligned parallel or vertical to the absorbing axis of the polarizing plate. Usually, when using the liquid crystal display device in the wide viewing angle mode, when the power is not applied to the W pixel, the same viewing angle characteristic as that of the related art vertical alignment liquid crystal display panel may be obtained by the RGB pixels.

If the LCD device is used in the narrow viewing angle mode, the electric field is applied such that the liquid crystal molecules are aligned parallel to or vertical to the absorbing axis of the polarizing plate. For example, as illustrated in FIG. 5D, because the polarized light incident in the direction indicated by the dotted arrow is not retarded, the light is blocked. Because the polarized light is retarded at a viewing angle in another direction (particularly, in the direction indicated by the solid arrow), the light is emitted from the W pixel so that the contrast deteriorates.

If there is a problem viewing an image in any direction, for example, in another W pixel, when power is applied, the liquid crystal molecules are aligned parallel to the direction indicated by the solid arrow, namely, perpendicular to the direction indicated by the dotted arrow so that the liquid crystal molecules in two pixels in the direction where the retardation does not occur (from which the light is not emitted) are eliminated. By doing so, the light is emitted in the right, left, upper, and downward directions so that the viewing angle can be completely controlled.

Needless to say, when viewing an image in the front direction, because the retardation does not occur in the W pixel in which the liquid crystal molecules are aligned in any direction, the light is hardly emitted so that the contrast can be maintained.

From the above result, the present invention has a property that is not found in the viewing angle controlling technique of the related art. Also, the present invention may reduce the manufacturing costs because there is no need for new components, modification of the manufacturing process, and the combination of two LCD panels.

Moreover, because the alignment direction of the liquid crystal molecules can be controlled according to a voltage in the W pixel, the viewing angle may be electrically adjusted so that the viewing angle may be adjusted by setting the area and the number of the W pixels.

This is an advantage of the present invention that the viewing angle may be freely adjusted by a panel designer or a user according to circumstances or his/her preference.

Hereinafter, the results of a simulation carried out modeling the viewing angle characteristic control in this embodiment of the present invention will be described. The simulation has been carried out by employing the liquid crystal optical device simulator LCD Master produced by Xingtech Co.

In this embodiment, glass substrates of 0.7 mm thickness are used as upper and lower substrates, an optical system is designed to have Δnd=0.56, an LCD panel with a negative dielectric anisotropy (Δ∈=–(negative) 4.1) is used, and polarizing axes of the polarizing plates are respectively defined by 45 degrees and 135 degrees.

The contrast has been estimated when a voltage of 3.3 V is applied. The RGB pixels are is designed such that the liquid crystal molecules are slanted in the direction of 90 degrees according to the definition when the voltage is applied. The W pixels are designed to be slanted in parallel in relation (according to the definition, in two directions at 45 degrees and 135 degrees) to the polarizing axes of two upper and lower polarizing plates when the voltage is applied.

Figure 6:
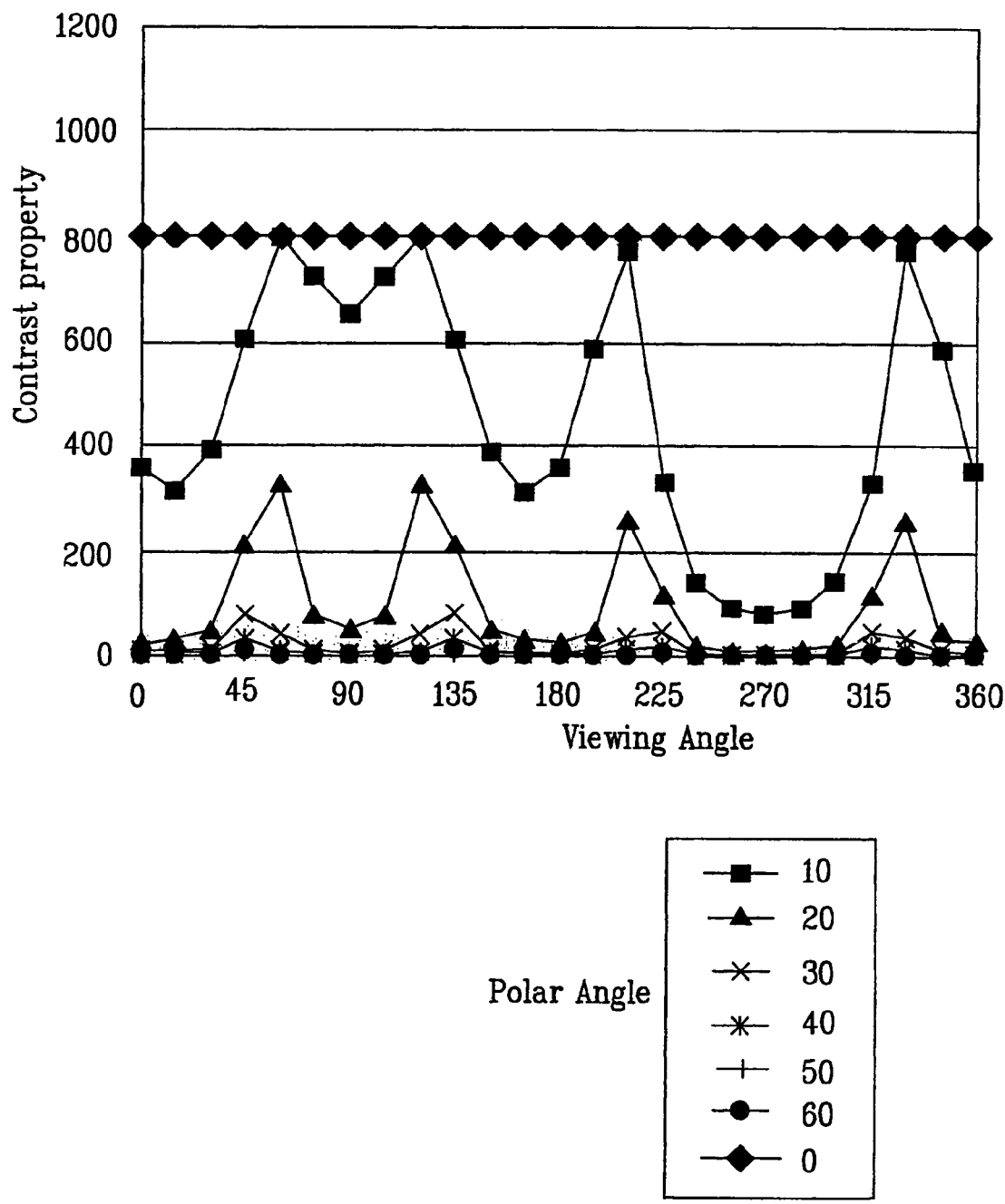
FIG. 6 is a graph illustrating contrast characteristic with respect to a viewing angle when an electric field is applied to the RGB pixels and when an electric field is not applied to the W pixel.

FIG. 6 is a graph illustrating the contrast ratio with respect to the viewing angle when 3.3 V is applied to the RGB pixels and 0 V is applied to the W pixels, namely, when the RGB pixels are turned on and the W pixels are turned off.

Figure 7:
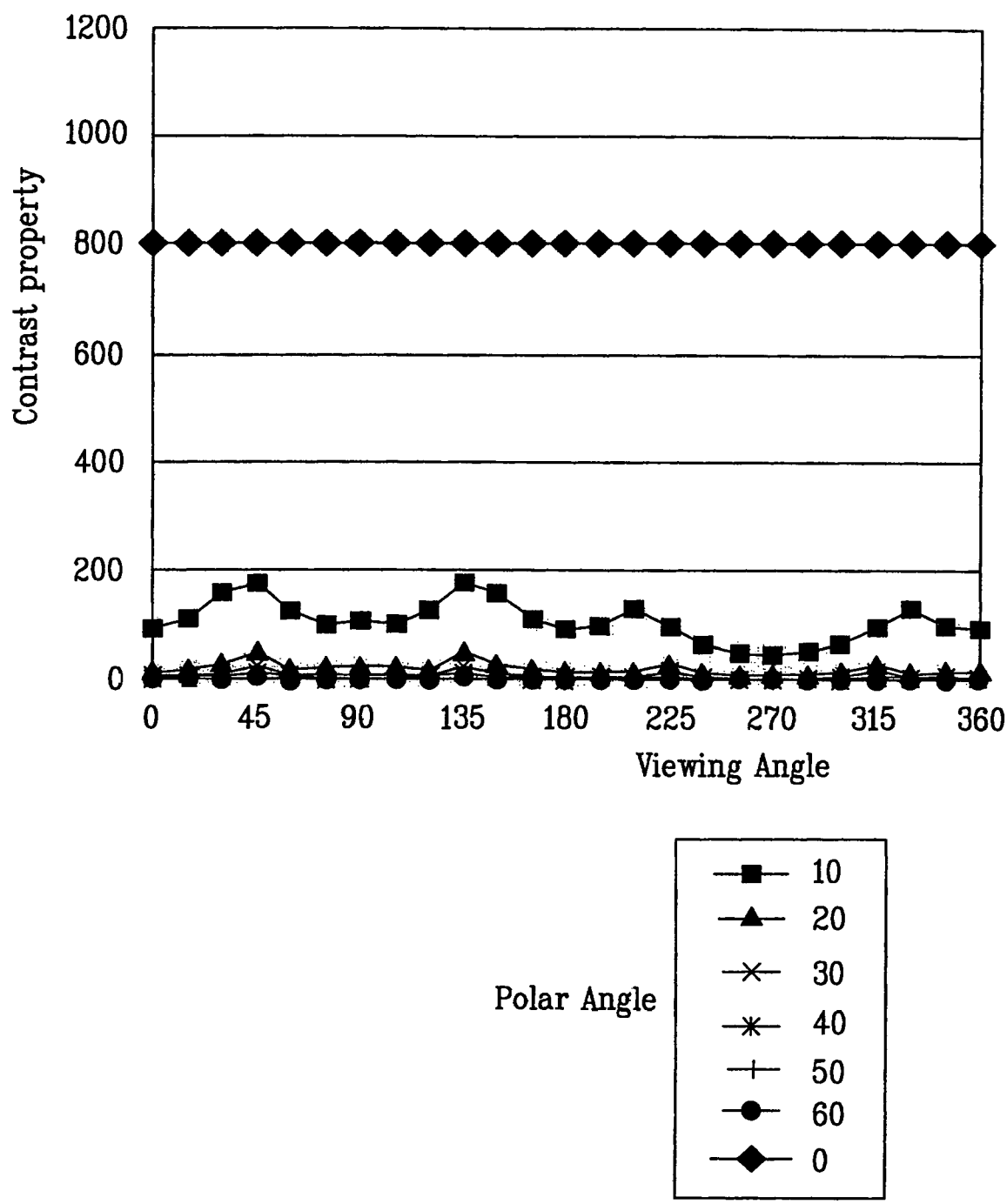
FIG. 7 is a graph illustrating contrast characteristic with respect to a viewing angle when 3.3 V is applied to the RGB pixels and the W pixel.

FIG. 7 is a graph illustrating the contrast ratio with respect to the viewing angle when 3.3 V is applied to the RGB pixels and 3.3 V is applied to the W pixels, namely, when the RGB pixels and the W pixels are turned on. In the graphs, the vertical axis indicates the contrast ratio and the horizontal axis indicates the viewing angle, respectively. The respective curves in the graphs show results of the simulation carried out at polar angles such as zero, 10, 20, 30, 40, 50, and 60 degrees.

From the above results, it can be understood that the contrast with respect to the viewing angle in the polar angle greatly deteriorates when the status of the W pixels is changed from the on state to the off state so as to minimize the deterioration of the front contrast.

The above result is an example. The area of the W pixel may be optimized when designing the W pixel, and the optimized viewing angle may be precisely controlled by a user that controls the magnitude of a voltage to be applied to the W pixels. These are advantages of the present invention.

Figure 8:
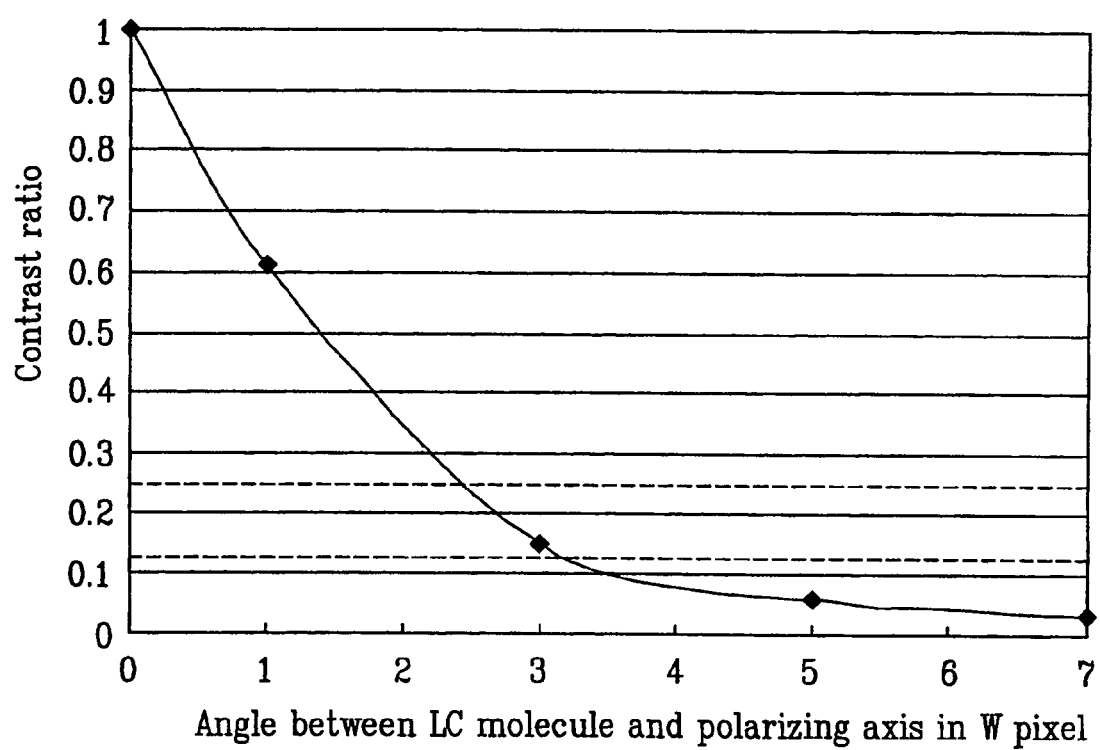
FIG. 8 is a graph illustrating contrast ratio directly in front of the display versus an angle formed by a polarizing axis and a liquid crystal molecule in the W pixel when the electric field is applied to the W pixel.

FIG. 8 is a graph illustrating front contrast ratio with respect to an angle formed between the polarizing axis and the liquid crystal molecules within the W pixel when 3.3 V is applied to the W pixels. In the graph, the vertical axis represents the contrast ratio and the horizontal axis represents the angle of the liquid crystal molecule with respect to the polarizing axis, respectively. When the angle formed by the polarizing axis and the direction where the liquid crystal molecules are slanted is 0 (zero) degrees, namely, when the polarizing axis is parallel to the slanted liquid crystal molecules, the contrast ratio becomes 1 (one). The curve on the graph represents the contrast ratio at the angle between the polarizing axis and the slanted liquid crystal molecules, 1 to 7 degrees.

According to the present invention, the contrast ratio in the direction where the liquid crystal molecules are slanted when a voltage is applied to the W pixels is superior to that obtained when the liquid crystal molecules are aligned parallel to the polarizing axis. However, as described in detail with reference to FIG. 8, the front contrast gradually deteriorates as the angle is increased from 0 (zero) degrees.

Referring to FIG. 7, when the contrast ratio is 100 to 200 in the direction of a 10 degree polar angle, because the front contrast is 800 as illustrated in FIG. 7, in order to maintain the contrast to be 100, it is preferred that the angle between the polarizing axis and the slanted liquid crystal molecules is less than at least 3 degrees.

As described above, it is preferred that the angle of the liquid crystal molecules with respect to the polarizing axis in the W pixels is 3 degrees to 0 (zero) degrees.

Moreover, in the present invention, although the RGB pixels are used as a display device, another pixel having a different color may be used as the display device.

Embodiment 2

In this embodiment, a TN mode is used. In the TN mode, the alignment directions of the liquid crystal molecules in the RGB pixels and the W pixels are different from each other, and this will be described.

FIGS. 9A to 9D are schematic plan views illustrating the alignment directions of the liquid crystal molecules in a pixel when the RGB pixels are powered on and the W pixel is powered off.

FIGS. 9A and 9B, on the left side in the drawing, illustrate the operating direction of the liquid crystal molecules in the RGB pixels and FIGS. 9C and 9D, on the right side in the drawing, illustrate the operating direction of the liquid crystal molecules in the W pixel when the electric field E is applied thereto or not. Here, a solid arrow and dotted arrow indicate the absorbing axes of the polarizing plates.

The operation of the RGB pixels will be described with reference to FIGS. 9A and 9B. Because the liquid crystal molecules rise when power is applied (FIG. 9A), the liquid crystal molecules look like ○ (a circle). However, when the power is not applied (FIG. 9B), the liquid crystal molecules are aligned with the absorbing axis (a rubbing direction) of the polarizing plate.

As illustrated in FIG. 9B, the alignment direction of the liquid crystal molecules of the TN RGB pixels is twisted by 90 degrees when the electric field is not applied and normally the RGB pixels are normally white. When the electric field is applied, as illustrated in FIG. 9A, the liquid crystal molecules are aligned in the direction where the liquid crystal molecules rise by the electric field.

Meanwhile, as illustrated in FIGS. 9C and 9D, because the liquid crystal molecules in the W pixel are homogenously aligned parallel to the rubbing direction when the electric field is not applied, the alignment direction of the liquid crystal molecules is not twisted. When the electric field is applied, the liquid crystal molecules are aligned with the direction where the liquid crystal molecules rise due to the electric field (See FIG. 9C).

In a normal mode, the W pixels are powered off, and the same viewing angle characteristic as that of the related art TN LCD panel may be obtained by the RGB pixels. If the narrow viewing angle mode is desired, the electric field is applied to the W pixels so that the liquid crystal molecules are aligned in the direction where the liquid crystal molecules rise.

Figure 9:
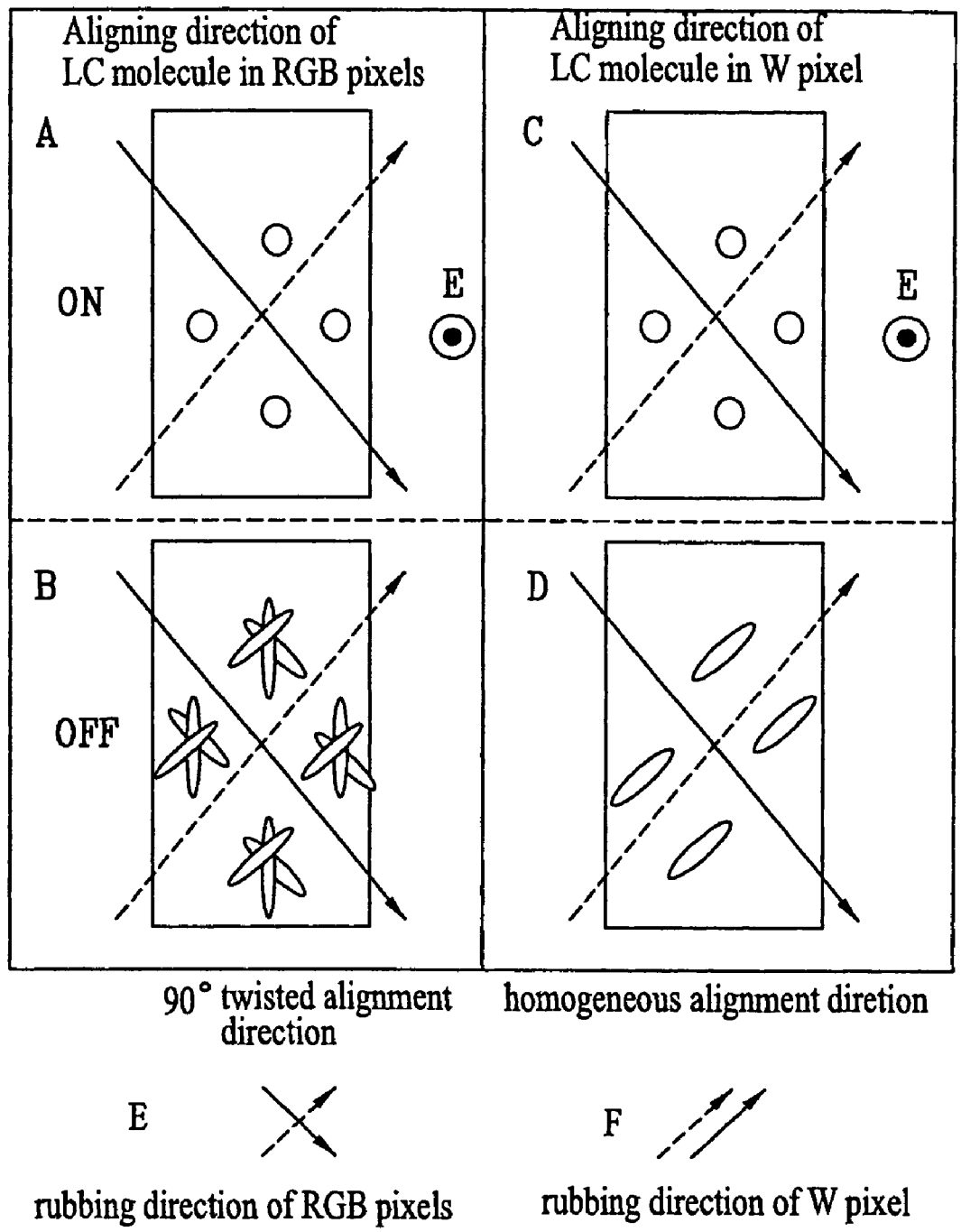
FIG. 9 is a schematic plan view illustrating the difference of operating directions of the RGB pixels and the W pixel in a TN LCD device.

By doing so, for example, as illustrated in FIG. 9, because the polarized light at a viewing angle indicated by the dotted arrow is not retarded, the light is blocked. Because the polarized light is retarded at a viewing angle in another direction (particularly, in the direction indicated by the solid arrow), the light is emitted from the W pixels so that the contrast deteriorates.

If there is a problem viewing an image in any direction, for example, the liquid crystal molecules in other adjacent W pixels are aligned parallel to the direction indicated by the solid arrow, namely, perpendicular to the direction indicated by the dotted arrow when the electric field is not applied, so that the directions where the retardation does not occur (from which the light is not emitted) in two pixels are minimized. By doing so, the light is emitted in the right, left, upper, and downward directions so that the viewing angle may be completely controlled.

Needless to say, when viewing an image in the front direction, because the retardation does not occur in the W pixels in which the liquid crystal molecules are aligned in any direction, the light is not emitted so that the contrast may be maintained.

The LCD panel may be manufactured using the manufacturing technology of the related art. In this embodiment where the TN LCD panel is employed, the liquid crystal molecules in the RGB pixels should have a 90 degrees twist (See FIG. 9B), and the liquid crystal molecules in the W pixel should have a 0 degree twist (homogeneous) (See FIG. 9D).

Thus, in any one of a color filter substrate and a TFT substrate, the rubbing directions of the RGB pixels and the W pixel should be changed by 90 degrees (See the solid arrows in FIGS. 9E and 9F).

In order to complete this, the rubbing directions in the RGB pixels, as illustrated in FIG. 9E, are crossed over each other in the upper and lower substrates, and the rubbing directions in the W pixel, as illustrated in FIG. 9F, are parallel to each other in the upper and lower substrates.

According to the rubbing techniques widely used now, because the liquid crystal molecules in the respective pixels should be aligned in the same direction, there is a need of a technique to align the liquid crystal molecules in the different directions in the RGB pixels and the W pixel.

As the above-mentioned technique, for example, Japanese Unexamined Patent Application Publication No. 2001-166309 discloses a multi-domain alignment technique. Hereinafter, the disclosed multi-domain alignment technique will be described.

Figure 13A:
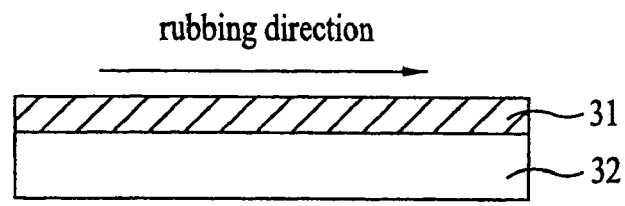
FIGS. 13A to 13C are a schematic view illustrating a multi-domain alignment method of a LCD device of the related art.
Figure 13B:
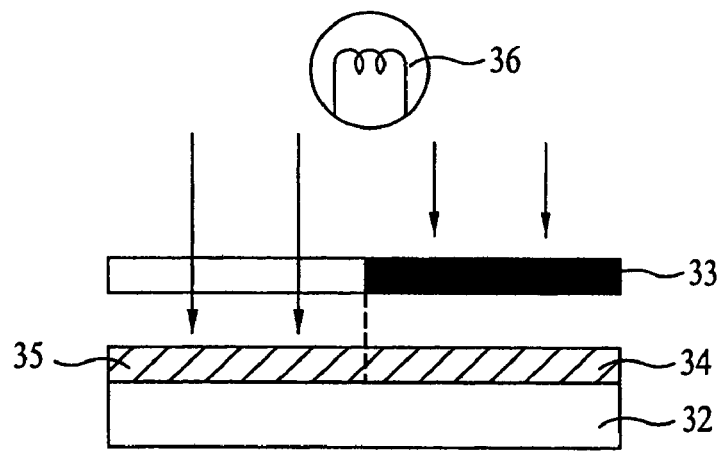
Figure 13C:
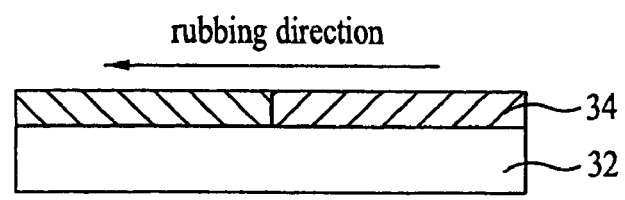

FIGS. 13A to 13C are a schematic view illustrating a manufacturing method of a LCD device that is the object of the above patent document. A reference numeral 31 is assigned to an alignment film in which the liquid crystal molecules may be aligned, a reference numeral 33 is assigned to a transparent substrate, a reference numeral 34 is assigned to a first alignment part on which a light is not irradiated during a light irradiation using a mask 33, a reference numeral 35 is assigned to a second alignment part on which a light is irradiated during the light irradiation, and a reference numeral 36 is assigned to a light source.

Hereinafter, the multi-domain alignment technique will be described with reference to FIGS. 13A to 13C.

As illustrated in FIG. 13A, a first rubbing process is preformed on the alignment film 31 formed on the transparent substrate 32. Sequentially, as illustrated in FIG. 13B, a light is irradiated from the light source 36, such as Deep-UV, UV or a He—Ne laser, on to the alignment film 31 through the mask 33. Accordingly, there are formed the first alignment part 34 where the light is not irradiated on the alignment film 31 and the second alignment part 35 where the light is irradiated.

Here, because the light is not irradiated, the first alignment part 34 maintains a pretilt angle during the first rubbing process. However, on the second alignment part 35, because the light is irradiated, the molecular chains of the alignment film 31 are decomposed, polymerized, or isomerized, so that the pretilt angle is changed.

Next, as illustrated in FIG. 13C, in a direction different from the first rubbing direction, a second rubbing weaker than the first rubbing is carried out. By doing so, the first alignment part 34 and the second alignment part 35 having different pretilt angles are processed by the second rubbing under a rubbing condition different from the first rubbing, so that the pretilt angles of the first alignment part 34 and the second alignment part 35 are different from each other, and the multi-domain alignment is achieved.

Hereinafter, the results of a simulation of the viewing angle characteristic control in the above embodiment will be described. The conditions of the simulation are identical to that of the first embodiment except for the liquid crystals having a positive dielectric anisotropy.

Figure 10:
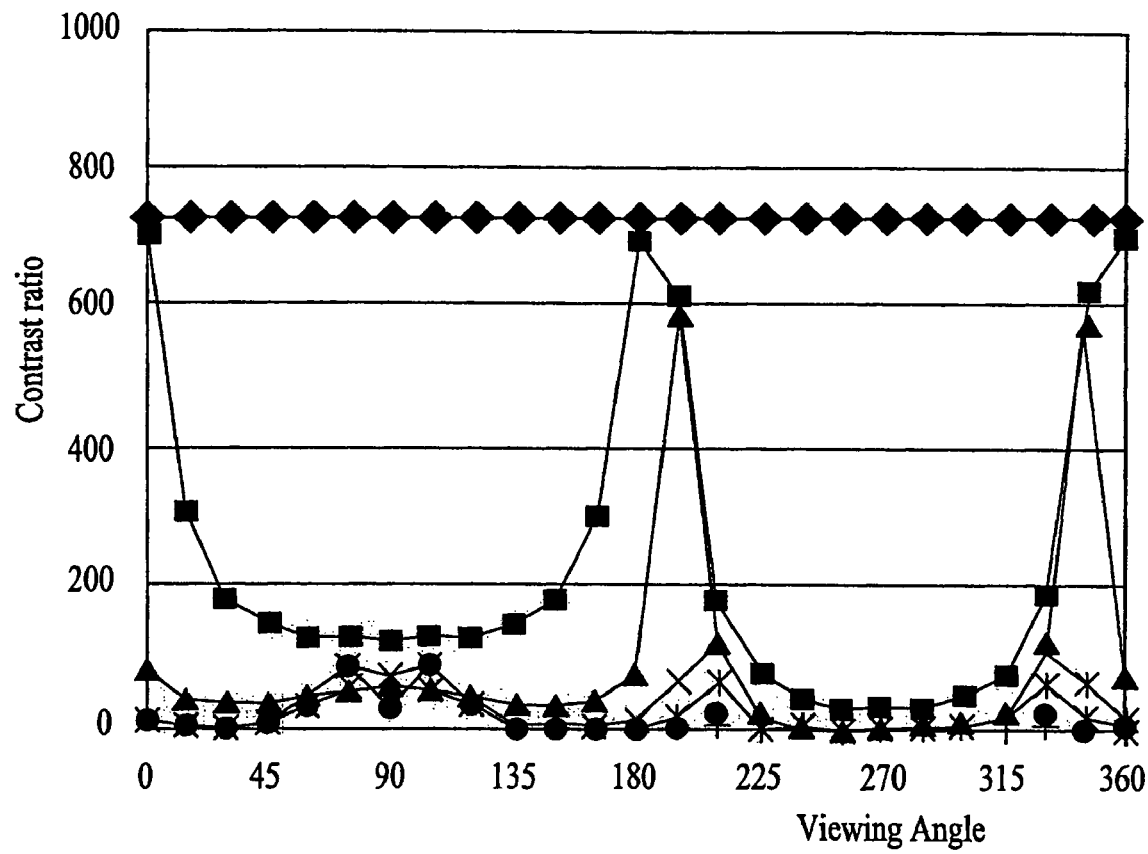
FIG. 10 is a graph illustrating contrast ratio versus viewing angle when the electric field is not applied to the RGB pixels and the electric field is applied to the W pixel.
Figure 10:
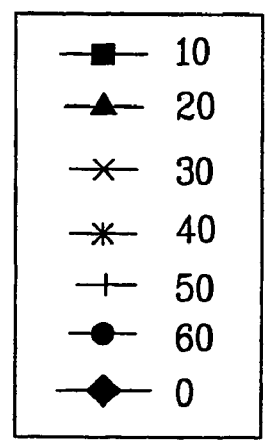

FIG. 10 is a graph illustrating contrast ratio versus viewing angle when the electric field is applied to only the RGB pixels.

Figure 11:
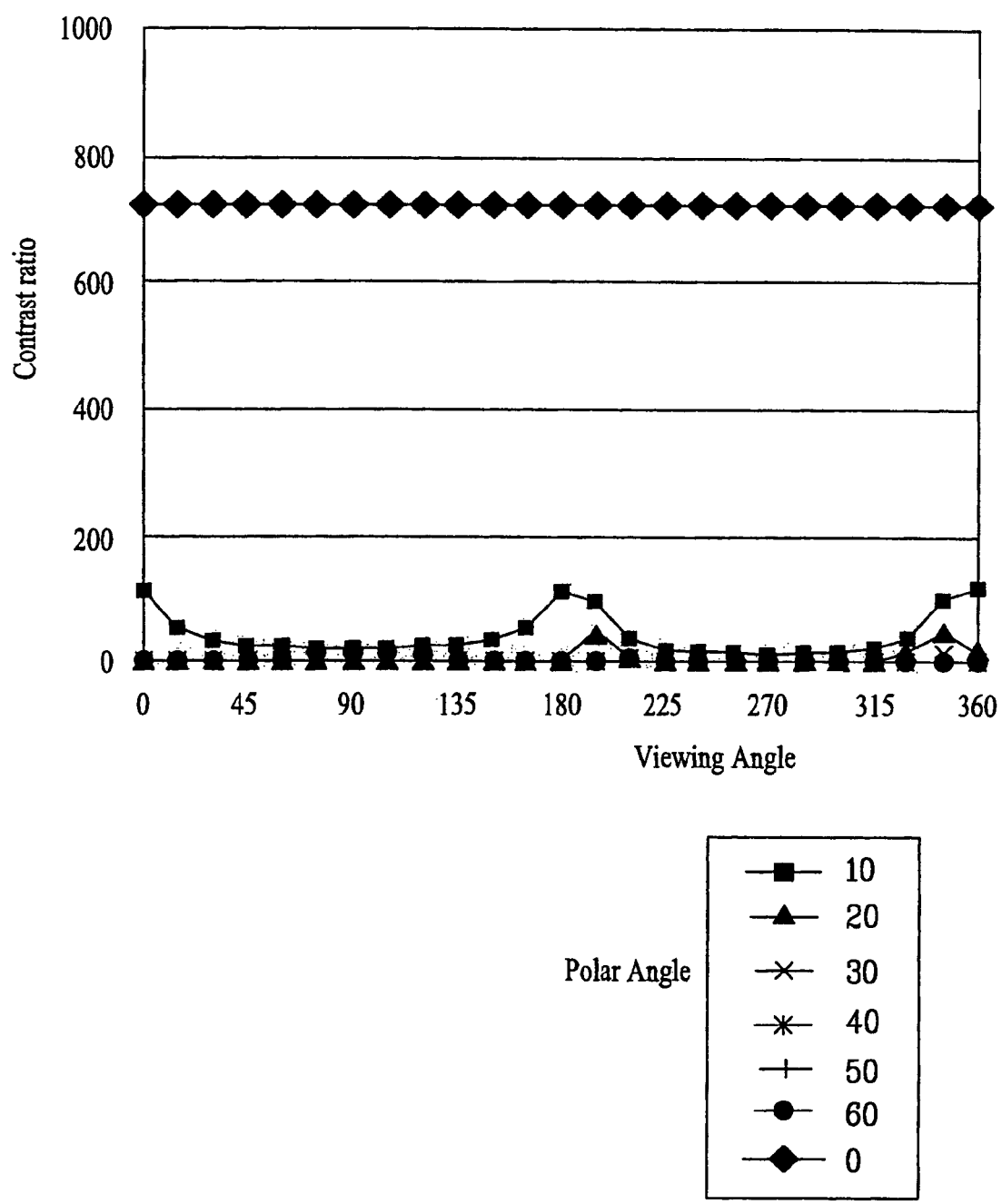
FIG. 11 is a graph illustrating contrast ratio versus viewing angle when the electric field is not applied to the RGB pixels and the W pixel.

FIG. 11 is a graph illustrating contrast ratio versus viewing angle when the electric field is applied to the RGB pixels and the W pixel and two W pixels are divided in the direction where the retardation does not occur (a light is not emitted).

From this result, it may be understood that the contrast at the polar angle 0 (zero) degree may be maintained but the contrast at the polar angles 10 to 30 degrees are extremely reduced. This represents where the W pixel does not emit a light from the front side thereof, but the light is emitted and the contrast is deteriorated when the polar angle increases.

From this result, it may be understood that the contrast with respect to the viewing angle in the polar angle is greatly reduced when the status of the W pixels is changed from the on state to the off state so as to minimize the deterioration of the front contrast.

From the above result, the present invention may greatly reduce the manufacturing costs because of having a characteristic that is not proposed by the related art viewing angle controlling technique, so there is no necessity for new components and the combination of two LCD panels.

Moreover, the area of the W pixel may be optimized when designing the W pixels, and because the alignment of the liquid crystal molecules in the W pixel may be controlled according to a voltage, the precision of the controlling viewing angle may be electrically adjusted.

By doing so, a user may freely adjust the viewing angle according to a circumstance or their preference and this is an advantage of the present invention.

Figure 12:
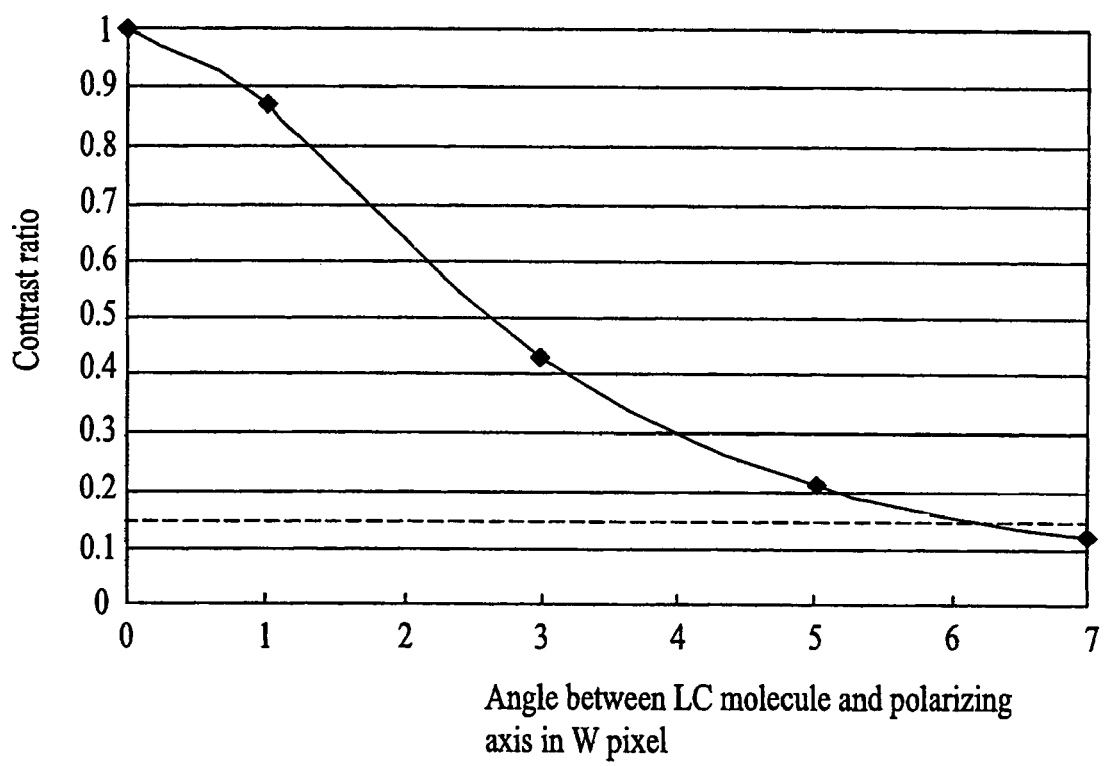
FIG. 12 is a graph illustrating contrast ratio directly in front of the display versus an angle formed by the polarizing axis and the liquid crystal molecule in a homogeneously aligned W pixel.

FIG. 12 is a graph illustrating a front contrast ratio versus angle formed by the polarizing axis and the liquid crystal molecules in the homogeneous aligned W pixel. In the graph, a vertical axis represents a contrast ratio and a horizontal axis represents an angle of the liquid crystal molecule with respect to the polarizing axis, respectively. When the angle formed by the polarizing axis and the direction where the liquid crystal molecules are slanted is 0 (zero) degrees, namely, when the polarizing axis is parallel to the slanted liquid crystal molecules, the contrast ratio becomes 1 (one). The curve in the graph represents the contrast ratio at the angle between the polarizing axis and the slant liquid crystal molecules, 1 to 7 degrees.

According to the present invention, the contrast characteristic in the direction where the liquid crystal molecules are slanted when a voltage is applied to the W pixels is superior to that obtained when the liquid crystal molecules are aligned parallel to the polarizing axis. However, as described in detail with reference to FIG. 12, the front contrast is gradually reduced as the angle is increased from 0 (zero) degrees. In this drawing, in order to vary the contrast from 700 to 100 (1/7=0.15), the angle between the polarizing axis and the slanted liquid crystal molecules should be less than at least 6 degrees.

As described above, it is more preferred that the angle of the liquid crystal molecules with respect to the polarizing axis in the W pixels is 6 degrees to 0 (zero) degrees.

Moreover, in this embodiment, although the RGB pixels and the W pixel are implemented in the TN LCD panel, it is possible to implement the RGB pixels in the TN mode and the W pixel in the VA mode. Also, it is possible to implement the RGB pixels in the VA mode and the W pixel in the TN mode.

Embodiment 3

As described above, the VA type LCD has a structure in which the liquid crystal molecule is slanted toward the vertical direction along the electric field, when power is applied. However, the respective slant directions of the liquid crystal molecules are not turned to one direction, and random light cannot be switched effectively.

Thus, in order to incline the liquid crystal molecules toward a predetermined direction, several known methods are used such as a method of forming a rib-shaped protrusion, a method of forming slit, and a method of irradiating a inclined light to the liquid crystal to form an angle. In this embodiment of the present invention, a LCD device in which a viewing angle may be controlled by forming a rib-shaped structure that is capable of precisely controlling a direction control and may be manufactured cheaply and a color filter used in the LCD will be described.

Figure 14:
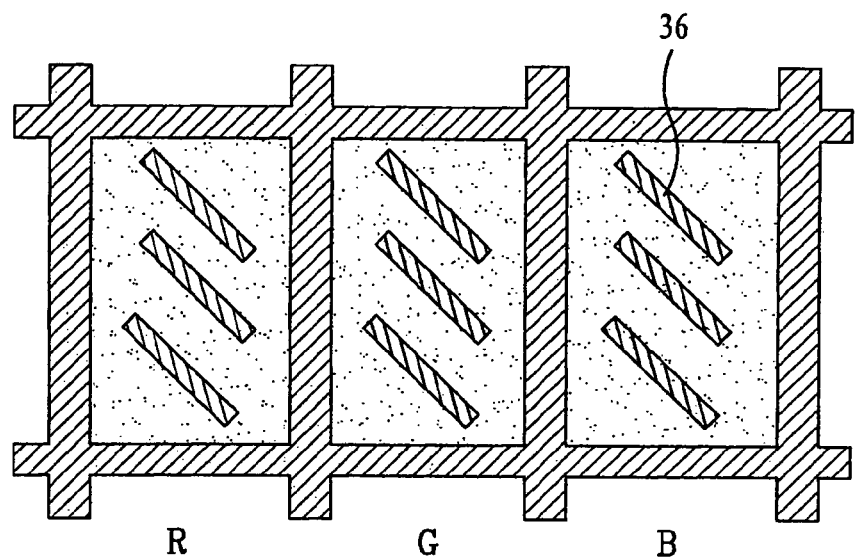
FIG. 14 is a plan view illustrating a structure of a color filter of LCD of the related art.

FIG. 14 is a plan view illustrating a related art color filter in which ribs are formed. As illustrated in FIG. 14, rib-shaped protrusions 36 are formed in the color filter, and the liquid crystal molecules are controlled to be slanted at a direction perpendicular to a longitudinal direction due to influence of the rib-shaped protrusions 36 when the liquid crystal molecules are slanted by the electric field.

Figure 15:
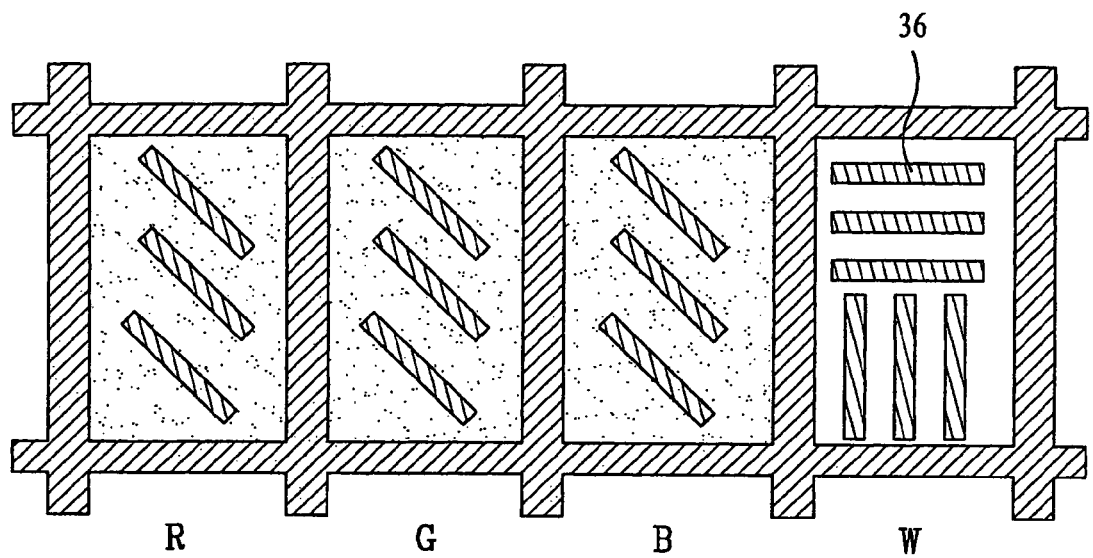
FIG. 15 is a schematic view illustrating an arrangement of RGB pixels and a W pixel in which ribs are formed according to an embodiment of the present invention.

FIG. 15 is a schematic view illustrating an arrangement of RGB pixels and W pixel in which the rib-shaped protrusions 36 are formed according to an embodiment of the present invention. The arrangement of the RGB pixels and the W pixel are not limited to this, but the RGB pixels and the W pixel may be arranged as illustrated in FIG. 3.

As illustrated in FIG. 15, the ribs arranged in the RGB pixels and the ribs arranged in the W pixel are arranged to form a predetermined angle, preferably, 45 degrees, with respect to the longitudinal direction.

Figure 16:
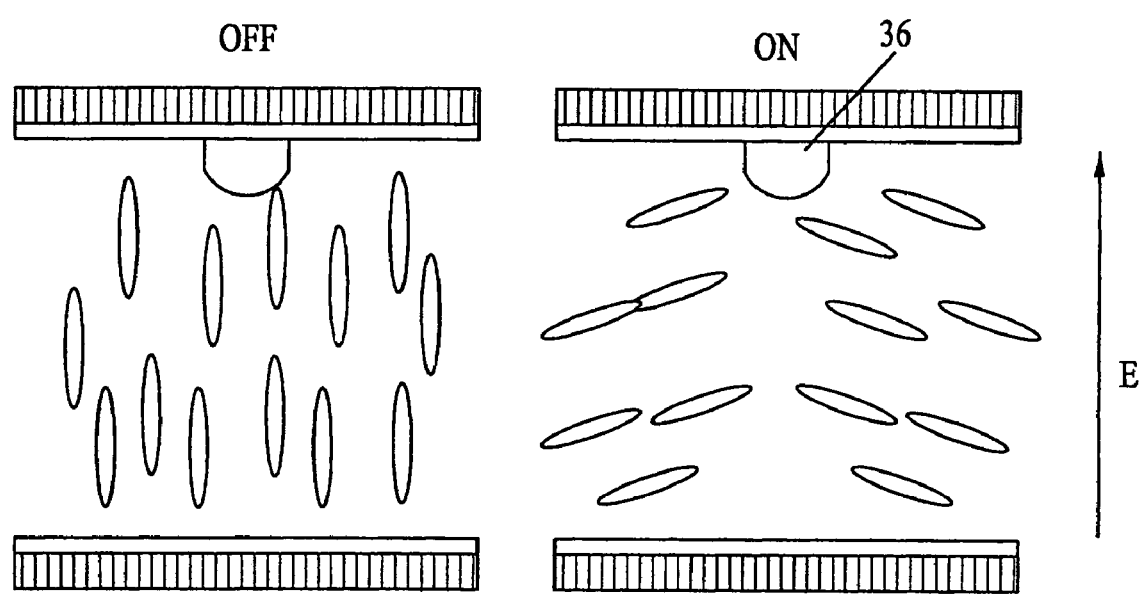
FIG. 16 is a sectional view illustrating operation of a liquid crystal molecule due to the ribs in a VA mode.

FIG. 16 is a sectional view illustrating operation of a liquid crystal molecule due to the ribs 36 in a VA mode. Because the VA mode is employed in this embodiment, the arrangement of the liquid crystal molecules is identical to that as illustrated in FIG. 3, and because there is no electric field when power is not applied as illustrated in FIG. 16, the liquid crystal molecules are vertically arranged with respect to the substrate.

Because polarizing plates 22 are attached to a liquid crystal device polarized light passes the polarizing plates 22 without retardation, and the display becomes black. When power is applied to apply an electric field to the polarizing plates 22, because the liquid crystal molecules have a negative dielectric anisotropy and intend to be vertical to the electric flux, the directions of the liquid crystal molecules are changed to a direction slanted from the vertical direction.

Thus, in this embodiment of the present invention, because the direction to which the liquid crystal molecules are slanted is controlled, the ribs 36 are arranged, as illustrated in FIG. 16, using the characteristic of the liquid crystal molecules to be slanted into a direction perpendicular to the longitudinal direction of the ribs so as to control the slant direction of the liquid crystal molecules.

In the present invention having the viewing angle controlling function, when the power is applied between the liquid crystal molecules in the RGB pixels and the liquid crystal molecule in the W pixel, the alignment direction of the molecules in the RGB pixels and the W pixel must be different from each other. Hereinafter, this difference will be described.

Figure 17:
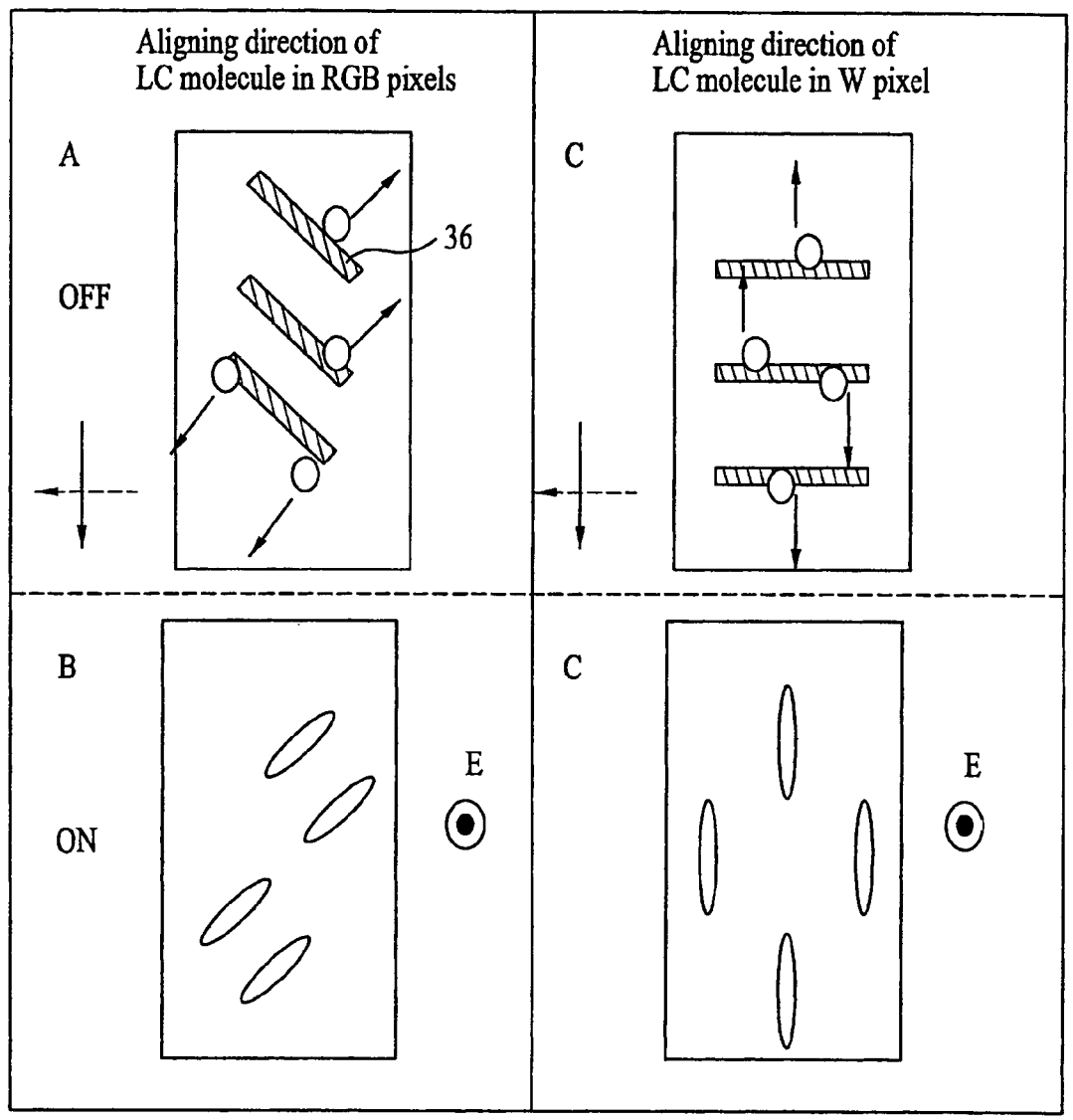
FIG. 17 is a plan view illustrating the arrangement of the liquid crystal molecule in cases of powering the RGB pixels and the W pixel off and on, respectively when overlooking a single pixel.

FIG. 17 is a plan view illustrating the alignment direction of the liquid crystal molecules in a single pixel when the power is applied to the RGB pixels and the W pixel or not.

FIGS. 17A and 17B illustrate the operating direction of the liquid crystal molecules in the RGB pixels, and FIGS. 17C and 17D illustrate the operating direction of the liquid crystal molecules in the W pixel when the electric field is applied thereto or not.

Here, a solid arrow and a dotted arrow indicate absorbing axes of the polarizing plates. In FIGS. 17A and 17B, because the liquid crystal molecules are vertically aligned when power is not applied, the liquid crystal molecules look like ○ (a circle). However, when the power is applied, the ribs 36 are arranged in the LCD panel to be 45 degrees with respect to absorbing axis of the polarizing plates so as to control the slant direction of the liquid crystal molecules.

By doing so, the liquid crystal molecules are aligned at an angle with respect to the absorbing axis of the polarizing plate so that the polarized light may be retarded and light is emitted from the opposite polarizing plate to display an image at a wide viewing angle.

Meanwhile, the W pixel will be described with reference to FIGS. 17C and 17D. Because the liquid crystal molecules in the W pixel are vertically aligned when the power is not applied, the liquid crystal molecules look like ○ (a circle). However, because the ribs 36 are arranged different from those of the RGB pixels when the power is applied, the liquid crystal molecules are aligned parallel or vertical to the absorbing axis of the polarizing plates.

Usually, when using the LCD device in the wide viewing angle mode, when the power is not applied to the W pixel, the same viewing angle characteristic as that of the VA LCD panel of the related art may be obtained by the RGB pixels.

If the LCD device is used in the narrow viewing angle mode, the electric field is applied such that the liquid crystal molecules are aligned parallel to or vertical to the absorbing axis of the polarizing plate. For example, as illustrated in FIG. 17, because the polarized light in the direction indicated by the solid arrow is not retarded, the light is blocked. Because the polarized incident light is retarded at a viewing angle in another direction (particularly, in the direction indicated by the dotted arrow), the light is emitted from the W pixel so that the contrast is reduced.

If it is not sufficient to make the viewing angles in two directions (a right-handed direction and a left-handed direction in the above example) be narrow, for example, in a W pixel of an adjacent column, the ribs of the W pixel are formed to be parallel to the direction indicated by the dotted arrow and to be perpendicular to the direction indicated by the solid arrow when the power is supplied so that the liquid crystal molecules in two W pixels interrupt the direction where the retardation does not occur (from which the light is not emitted). By doing so, the light is emitted in four directions (the right, left, upper, and downward directions) so that the viewing angle may be completely controlled.

Needless to say, in the front direction, because the retardation does not occur from the W pixel in which the liquid crystal molecules are aligned in any direction, the light is hardly emitted so that the contrast may be maintained.

This configuration may be implemented, for example, as illustrated in FIG. 15, by forming the ribs 36 perpendicular to the longitudinal directions of each other in a single W pixel among W pixels.

Moreover, a sub-pixel of the RGB pixels has a region having the rib-shaped structure being slanted at 45 degrees with respect to the absorbing axis of the polarizing plate used to display an image and a region having a rib-shaped structure being parallel to the absorbing axis of the polarizing plates used to control the viewing angle, and these structures are added to the usual displaying function of the sub-pixels of the RGB pixels to have the same viewing angle function as that of the W pixel so that the W pixel may be eliminated.

Hereinafter, the results of a simulation carried out for the viewing angle characteristic control of this embodiment of the present invention will be described. The simulation has been carried out by employing a liquid crystal optical device simulator LCD Master produced by Xingtech Co.

In this embodiment, glass substrates of 0.7 mm thickness are used as upper and lower substrates, an optical system is designed to have $\Delta nd=0.56$, a LCD panel with a negative dielectric anisotropy ($\Delta \in = -(\text{negative})\ 4.1$) is used, and polarizing axes of the polarizing plates are respectively defined as 45 degrees and 135 degrees.

The contrast has been estimated when a voltage of 3.3 V is applied. The RGB pixels are designed such that the liquid crystal molecules are slanted in the direction of 90 degrees when the voltage is applied. The W pixels are designed to be slanted in parallel in relation (according to the definition, in two directions at 45 degrees and 135 degrees) to the polarizing axes of two upper and lower polarizing plates.

Figure 18:
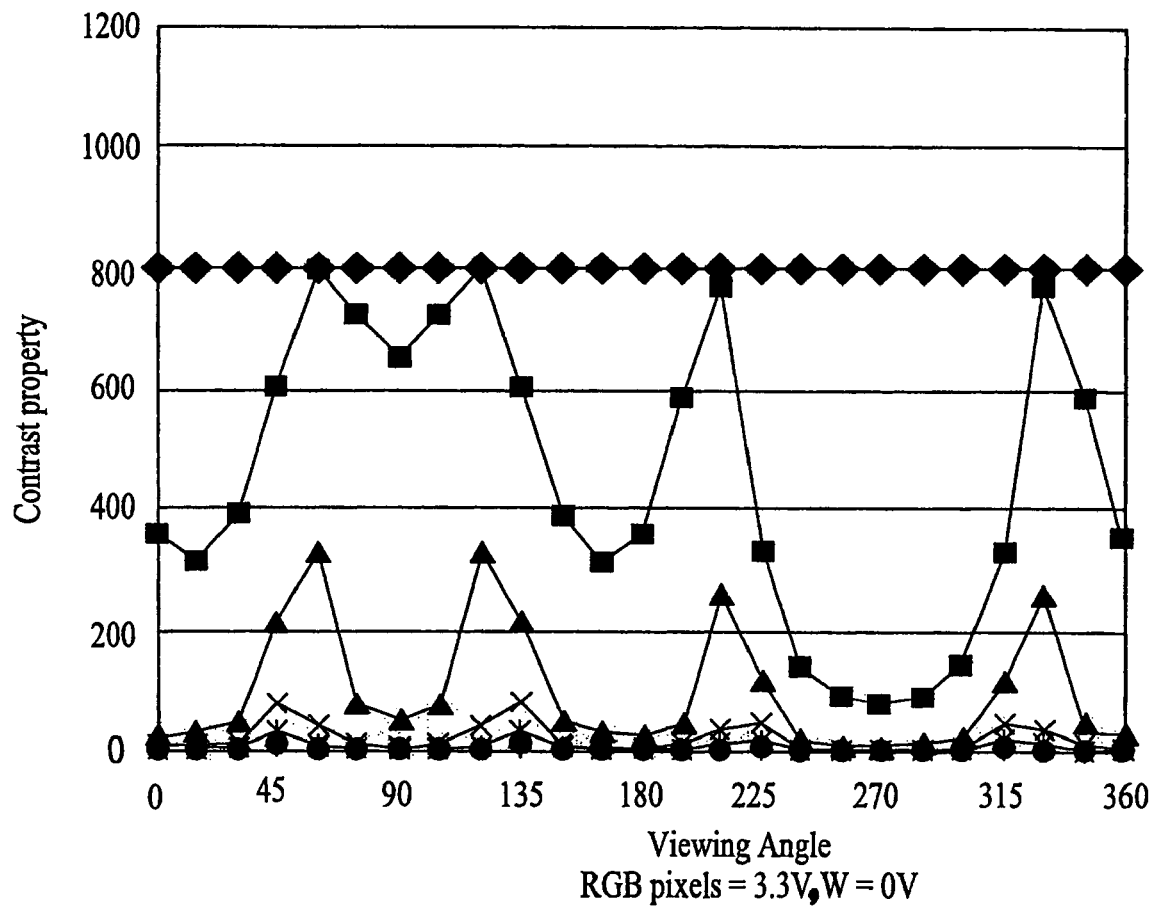
FIG. 18 is a graph illustrating contrast ratio versus viewing angle when a 3.3v signal is applied to the RGB pixels and a 0 V signal is applied to the W pixel.
Figure 18:
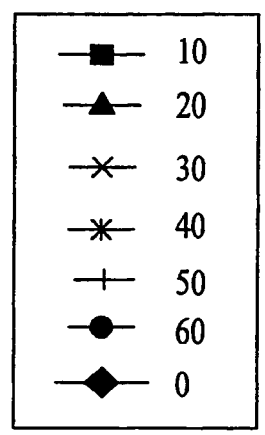

FIG. 18 is a graph illustrating a contrast ratio versus viewing angle when 3.3 V is applied to the RGB pixels and 0 V is applied to the W pixels, namely, when the RGB pixels are turned on and the W pixels are turned off.

Figure 19:
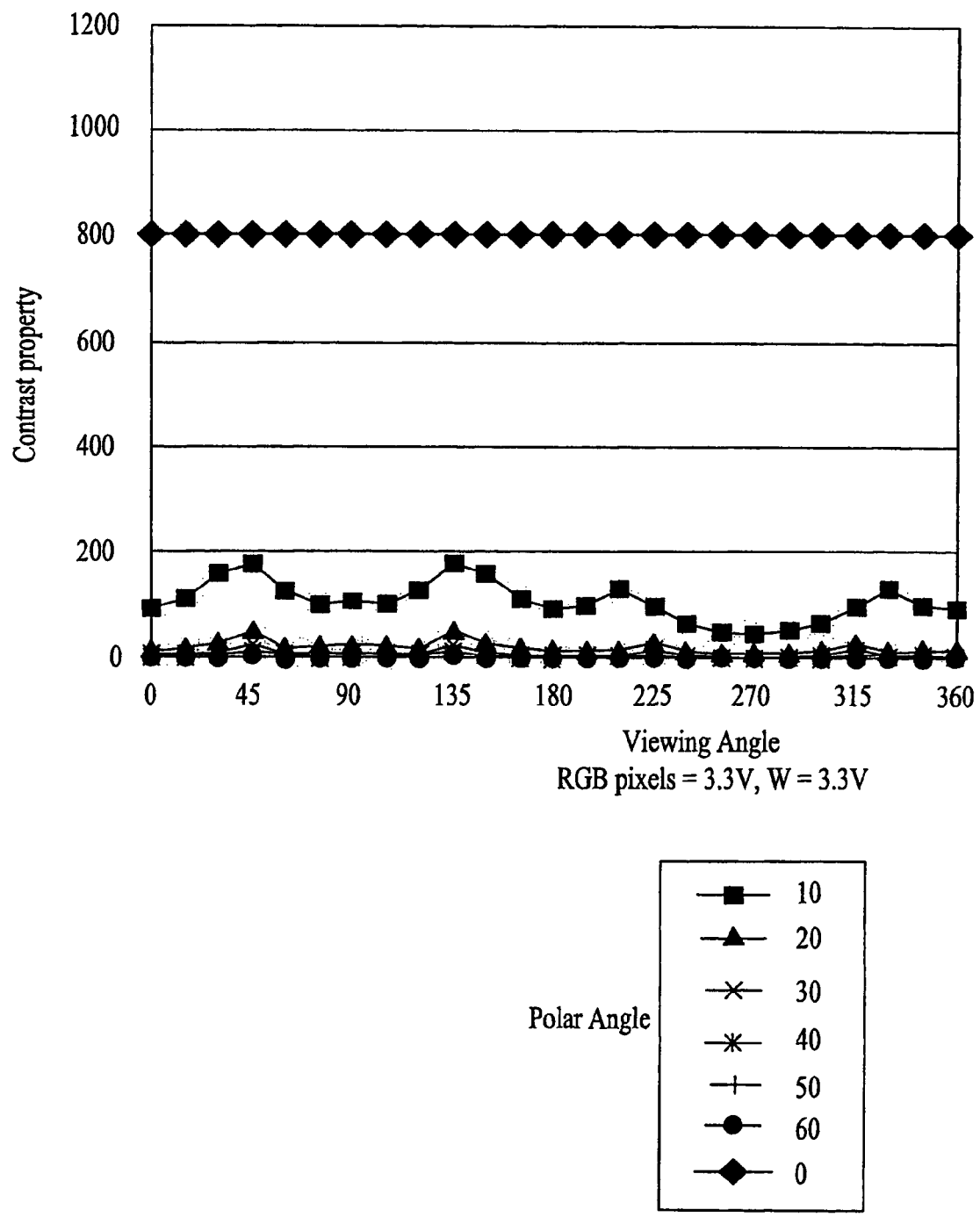
FIG. 19 is a graph illustrating contrast ratio versus viewing angle when a 3.3 V signal is applied to the RGB pixels and the W pixel.

FIG. 19 is a graph illustrating a contrast characteristic with respect to a viewing angle when 3.3 V is applied to the RGB pixels and 3.3 V is applied to the W pixels, namely, when the RGB pixels and the W pixels are turned on. In the graphs, a vertical axis indicates the contrast ratio and a horizontal axis indicates the viewing angle, respectively. The respective curves in the graphs show results of the simulation carried out at polar angles such as zero, 10, 20, 30, 40, 50, and 60 degrees.

From the above results, it may be understood that the contrast ratio versus viewing angle in the polar angle is greatly reduced when the status of the W pixels is changed from the on state to the off state so as to minimize the deterioration of the front contrast.

The above result is only an example. The area of the W pixel may be optimized when designing the W pixel, and the optimized viewing angle may be precisely controlled by a user that controls the magnitude of a voltage to be applied to the W pixels. These are advantages of the present invention.

Figure 20:
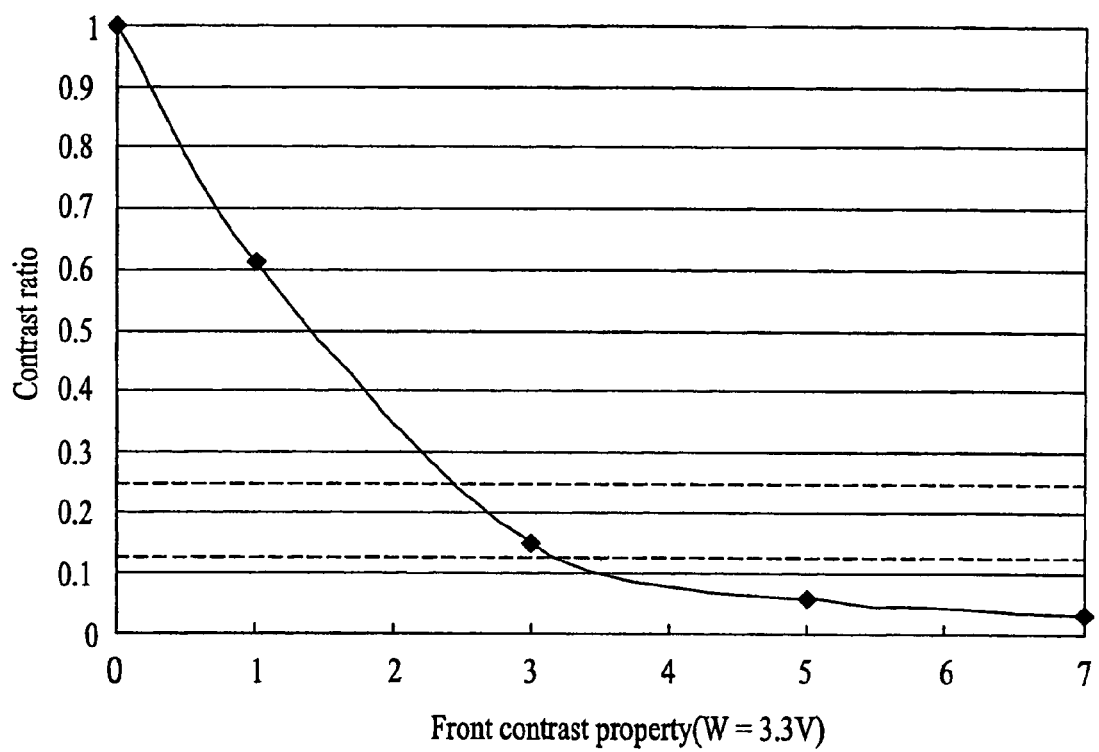
FIG. 20 is a graph illustrating contrast ratio directly in front of the display versus an angle formed by a polarizing axis and a liquid crystal molecule in the W pixel when the electric field is applied to the W pixel.

FIG. 20 is a graph illustrating front contrast ratio versus the angle formed between the polarizing axis and the liquid crystal molecules within the W pixel when 3.3 V is applied to the W pixels. In the graph, the vertical axis represents a contrast ratio and the horizontal axis represents an angle of the liquid crystal molecule with respect to the polarizing axis, respectively. When the angle formed by the polarizing axis and the direction where the liquid crystal molecules are slanted is 0 (zero) degrees, namely, when the polarizing axis is parallel to the slant liquid crystal molecules, the contrast ratio becomes 1 (one). A curve in the graph represents the contrast ratio at the angle between the polarizing axis and the slant liquid crystal molecules, from 1 to 7 degrees.

According to an aspect of the present invention, the contrast characteristic in the direction where the liquid crystal molecules are slanted when a voltage is applied to the W pixels is superior to that obtained when the liquid crystal molecules are aligned parallel to the polarizing axis. However, as described in detail with reference to FIG. 20, the front contrast gradually reduces as the angle is increased from 0 (zero) degree.

Referring to FIG. 19, when a contrast is 100 to 200 in the direction of 10 degrees polar angle, because the front contrast is 800 as illustrated in FIG. 19, in order to maintain the contrast to be 100, it is preferred that the angle between the polarizing axis and the slant liquid crystal molecules is less than at least 3 degrees.

As described above, it is more preferred that the angle of the liquid crystal molecules with respect to the polarizing axis in the W pixels is 3 degrees to 0 (zero) degrees.

Moreover, in the present invention, although the RGB pixels are used as a display device, a pixel with other color may be used as the display device.

In addition, according to the present invention, a light is simply controlled in the W pixel to lower the contrast, and it is possible to control the viewing angle by which the RGB pixels display an image different from an image or information to be originally displayed.

According to the present invention, there is no need of a component to collimate a light as employed in the related art, and the problem of the viewing angle may be solved by a single LCD panel without the combination of two LCD panels, and the LCD device according to the present invention is operated by the related art backlight technology. Thus, the manufacturing costs may be reduced and the LCD may be manufactured cheaply in commercial quantity.

Moreover, a user controls a voltage applied to the pixels so that the controlling of the optimal viewing angle may be minutely adjusted by the user.

It will be apparent to those skilled in the art that various modifications and variations may be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
at least one pixel including at least three color sub-pixels and at least one white sub-pixel, for controlling a view angle, wherein, for a narrow viewing angle mode, liquid crystal molecules in the white sub-pixel are aligned to be driven by a different direction from liquid crystal molecules in the at least three color sub-pixels, wherein initial alignment directions of liquid crystal molecules in the three color sub-pixels are the same as each other,
wherein the white sub-pixel is turned-off when in a wide viewing angle mode and is turned-on-state when in the narrow viewing angle mode.

2. The device according to claim 1, wherein the liquid crystal display device is a VA mode.

3. The device according to claim 2, further comprising: a controlling means for controlling the liquid crystal molecule with respect to an electric field in the at least three color sub-pixels and the white sub-pixel.

4. The device according to claim 3, wherein the controlling means includes at least one rib-shaped protrusion.

5. The device according to claim 4, wherein the rib-shaped protrusion in the white sub-pixel is arranged to have an angle with respect to a longitudinal direction of the rib-shaped protrusion in the at least three color sub-pixels.

6. The device according to claim 5, wherein the angle is 45 degrees.

7. The device according to claim 1, wherein the liquid crystal display device is a TN mode.

8. The device according to claim 2, wherein the white sub-pixel is a homogeneous alignment type or a vertical alignment type.

9. The device according to claim 7, wherein the white sub-pixel is at least one of a homogeneous alignment type and a vertical alignment type.

10. The device according to claim 6, wherein the liquid crystal molecules in the at least three color sub-pixels are vertically aligned when being off, and the direction of the liquid crystal molecules are changed to a direction other than a direction parallel to an absorbing axis of at least one polarizing plate when being on; and
wherein the liquid crystal molecules in the white sub-pixel are vertically aligned when being off, and the direction of the liquid crystal molecules are changed to 3 degrees to 0 (zero) degrees with respect to the absorbing axis of the at least one polarizing plate when being on.

11. The device according to claim 7, wherein the liquid crystal molecules in the at least three color sub-pixels rises along an electric flux when being on and is twisted between polarizing plates when being off; and
wherein the liquid crystal molecules in the white sub-pixel rise along the electric flux when being on, and the direction of the liquid crystal molecule is changed to about 6 degrees to 0 (zero) degrees with respect to an absorbing axis of at least one polarizing plate and so the liquid crystal molecules are homogeneously aligned when being off.

12. The device according to claim 1, wherein the pixel includes at least one of R, G, and B sub-pixels and a plurality of sub-pixels with R, G, B, and other colors, for displaying video.

13. The device according to claim 1, wherein the white sub-pixel is at least one of white sub-pixel no-colored and colored.

14. A liquid crystal display device comprising:
at least one pixel including at lease one sub-pixel and at least one white sub-pixel; and
a liquid crystal molecules alignment controller to adjust a contrast; wherein the liquid crystal molecules are aligned at an angle of 3 degrees to 0 (zero) degree or of 6 degrees to 0 (zero) degree with respect to an absorbing axis of at least one polarizing plate in the sub-pixel or the white sub-pixel by the liquid crystal molecule alignment controller.

15. The device according to claim 14, wherein the liquid crystal display device is a VA mode.

16. The device according to claim 14, wherein the liquid crystal display device is a TN mode.

17. The device according to claim 15, wherein the white sub-pixel is at least one of a homogeneous alignment type and a vertical alignment type.

18. The device according to claim 16, wherein the white sub-pixel is at least one of a homogeneous alignment type and a vertical alignment type.

19. The device according to claim 10, wherein the liquid crystal molecules aligned in the white sub-pixel are aligned differently from liquid crystal molecules aligned in the sub-pixel.

20. The device according to claim 15, wherein the liquid crystal molecules in the sub-pixel are vertically aligned when being off, and the direction of the liquid crystal molecules is changed to a direction other than a direction parallel to an absorbing axis of at least one polarizing plate when being on; and
wherein the liquid crystal molecules in the white sub-pixel are vertically aligned when being off, and the direction of the liquid crystal molecules is changed to 3 degrees to 0 (zero) degree with respect to the absorbing axis of the at least one polarizing plate when being on.

21. The device according to claim 16, wherein the liquid crystal molecules in the sub-pixel rises along an electric flux when being on, and is twisted between polarizing plates when being off; and
wherein the liquid crystal molecules in the white sub-pixel rises along the electric flux when being on, and the direction of the liquid crystal molecules are changed to 6 degrees to 0 (zero) degree with respect to an absorbing axis of at least one polarizing plate and the liquid crystal molecules are homogeneously aligned when being off.

22. The device according to claim 14, wherein the pixel includes at least one of R, G, and B sub-pixels and a plurality of sub-pixels with R, G, B, and other colors, for displaying video.

23. The device according to claim 14, wherein the white sub-pixel is at least one of white sub-pixel no-colored and colored, or the white sub-pixel is colored in the substantially same color as that of the sub-pixel, for controlling a viewing angle.

24. A method of a liquid crystal display device for controlling a viewing angle comprising:
aligning liquid crystal molecules in at least at least three color sub-pixels and at least one white sub-pixel, in at least one pixel, wherein the liquid crystal molecules in the white sub-pixel are aligned differently from the liquid crystal molecules in the at least three color sub-pixels; and controlling a viewing angle by which an electric field is applied to the at least three color sub-pixels and the white sub-pixel or not, wherein, for a narrow viewing angle mode, liquid crystal molecules in the white sub-pixel are aligned to be driven by a different direction from liquid crystal molecules in the at least three color sub-pixels when the electric field is applied to the at least three color sub-pixels and the white sub-pixel, wherein initial alignment directions of liquid crystal molecules in the three color sub-pixels are the same as each other, wherein the white sub-pixel is turned-off when in a wide viewing angle mode and is turned-on-state when in the narrow viewing angle mode.

25. The method according to claim 24, wherein the liquid crystal display device is a VA mode.

26. The method according to claim 24, wherein the liquid crystal display device is a TN mode.

27. The method according to claim 25, wherein the white sub-pixel is at least one of a homogeneous alignment type or and a vertical alignment type.

28. The method according to claim 26, wherein the white sub-pixel is at least one of a homogeneous alignment type and a vertical alignment type.

29. The method according to claim 25, wherein the liquid crystal molecules in the at least three color sub-pixels are vertically aligned when being off, and the direction of the liquid crystal molecules is changed to a direction other than a direction parallel to an absorbing axis of at least one polarizing plate when being on; and wherein the liquid crystal molecules in the white sub-pixel are vertically aligned when being off, and the direction of the liquid crystal molecules is changed to 3 degrees to 0 (zero) degree with respect to the absorbing axis of the at least one polarizing plate when being on.

30. The method according to claim 26, wherein the liquid crystal molecules in the at least three color sub-pixels stand up along an electric flux when being on, and is twisted between polarizing plates when being off; and wherein the liquid crystal molecules in the white sub-pixel rises along the electric flux being on, and the direction of the liquid crystal molecules is changed to 6 degrees to 0 (zero) degrees with respect to an absorbing axis of at least one polarizing plate and the liquid crystal molecules is homogeneously aligned when being off.

31. The method according to claim 24, wherein the pixel includes at least one of R, G, and B sub-pixels and a plurality of sub-pixels with R, G, B, and other colors, for displaying video.

32. The method according to claim 24, wherein the white sub-pixel is at least one of white sub-pixel no-colored and colored, or the white sub-pixel is colored in the same color as that of the sub-pixel.

* * * * *